(12) United States Patent
Schneider

(10) Patent No.: US 10,934,209 B2
(45) Date of Patent: Mar. 2, 2021

(54) GLASS-BASED ARTICLES HAVING IMPROVED FRACTURE PERFORMANCE

(71) Applicant: CORNING INCORPORATED, Corning, NY (US)

(72) Inventor: Vitor Marino Schneider, Painted Post, NY (US)

(73) Assignee: Corning Incorporated, Corning, NY (US)

(*) Notice: Subject to any disclaimer, the term of this patent is extended or adjusted under 35 U.S.C. 154(b) by 713 days.

(21) Appl. No.: 15/727,897

(22) Filed: Oct. 9, 2017

(65) Prior Publication Data

US 2018/0105461 A1 Apr. 19, 2018

Related U.S. Application Data

(60) Provisional application No. 62/407,751, filed on Oct. 13, 2016.

(51) Int. Cl.
*C03C 21/00* (2006.01)
*C03C 3/097* (2006.01)
*C03C 17/30* (2006.01)

(52) U.S. Cl.
CPC ............ *C03C 21/002* (2013.01); *C03C 3/097* (2013.01); *C03C 17/30* (2013.01); *C03C 21/005* (2013.01); *C03C 2204/02* (2013.01)

(58) Field of Classification Search
CPC .................................................. C03C 2204/02
See application file for complete search history.

(56) References Cited

U.S. PATENT DOCUMENTS

| 3,495,963 A | 2/1970 | Buckley et al. |
| 5,411,585 A | 5/1995 | Avery et al. |

(Continued)

FOREIGN PATENT DOCUMENTS

| CN | 104999530 A | 10/2015 | |
| WO | 1996002272 A2 | 2/1996 | |
| WO | WO-2015164556 A1 * | 10/2015 | ............... C03C 4/18 |

OTHER PUBLICATIONS

Billmeyer, Jr., "Current American Practice in Color Measurement," Applied Optics, vol. 8, No. 4, pp. 737-750 (Apr. 1969).
(Continued)

*Primary Examiner* — David Sample
(74) *Attorney, Agent, or Firm* — Jeffrey A. Schmidt

(57) ABSTRACT

Glass-based articles article are described and have a first surface and a second surface opposing the first surface defining a thickness (t) (mm); and a compressive stress (CS) layer containing ion-exchanged potassium and ion-exchanged silver or ion-exchanged potassium and ion-exchanged copper, the CS layer extending from the first surface to a depth of compress (DOC), wherein the DOC is in a range of 0.1·t and 0.3·t, the CS at the first surface in a range of 300 MPa and 1500 MPa and defining a compressive stress profile including a spike region, a tail region and a knee region between the spike region and the tail region, wherein all points of the stress profile in the spike region comprise a tangent having a value that is in a range of −15 MPa/micrometer and −200 MPa/micrometer and all points in the tail region comprise a tangent having a value that is in a range of −0.01 MPa/micrometer and −3 MPa/micrometer.

22 Claims, 12 Drawing Sheets

(56) References Cited

U.S. PATENT DOCUMENTS

| | | |
|---|---|---|
| 6,326,417 B1 | 12/2001 | Jia |
| 7,329,762 B2 | 2/2008 | Fraley et al. |
| 8,854,623 B2 | 10/2014 | Fontaine et al. |
| 2012/0034435 A1 | 2/2012 | Borrelli et al. |
| 2012/0277141 A1 | 11/2012 | Smith et al. |
| 2012/0295986 A1 | 11/2012 | Smith et al. |
| 2014/0356406 A1 | 12/2014 | Patil et al. |
| 2014/0370302 A1 | 12/2014 | Amin et al. |
| 2014/0370303 A1 | 12/2014 | Jin et al. |
| 2015/0147576 A1* | 5/2015 | Bookbinder ............ C03C 3/097 428/410 |
| 2015/0239777 A1 | 8/2015 | Mauro |
| 2016/0002103 A1 | 1/2016 | Wang et al. |
| 2016/0122239 A1 | 5/2016 | Amin et al. |
| 2016/0280592 A1* | 9/2016 | Amin .................... C03C 21/002 |
| 2017/0113967 A1* | 4/2017 | Chapman ................. C03C 4/00 |
| 2017/0233287 A1 | 8/2017 | Li et al. |

OTHER PUBLICATIONS

International Search Report and Written Opinion PCT/US2017/056446 Dated Dec. 11, 2017.
Sglavo & Green, "Flaw intsensitive ion-exchanged glass: I, Theoretical Aspects" JACS 84(8), 2001. pp. 1827-1831.
Sglavo & Green, "Flaw intsensitive ion-exchanged glass: II, Production and Mechanical Performance" JACS 84(8), 2001. pp. 1832-1838.

* cited by examiner

GLASS-BASED ARTICLES HAVING IMPROVED FRACTURE PERFORMANCE

CROSS-REFERENCE TO RELATED APPLICATIONS

This application claims the benefit of priority under 35 U.S.C. § 119 of U.S. Provisional Application Ser. No. 62/407,751 filed on Oct. 13, 2016, the content of which is relied upon and incorporated herein by reference in its entirety.

BACKGROUND

Field

This disclosure relates to glass-based articles exhibiting improved fracture performance, and more particularly to glass-based articles containing ion-exchanged copper or ion-exchanged silver exhibiting improved fracture performance compared to glass-based articles that do not contain ion-exchanged silver or ion-exchanged copper.

Technical Background

Glass-based articles often experience severe impacts that can introduce large flaws into a surface of such articles. Such flaws can extend to depths of up to about 200 micrometers from the surface. Traditionally, thermally tempered glass has been used to prevent failures caused by the introduction of such flaws into the glass because thermally tempered glass often exhibits large compressive stress (CS) layers (e.g., approximately 21% of the total thickness of the glass), which can prevent the flaws from propagating further into the glass and thus, can prevent failure. An example of a stress profile generated by thermal tempering is shown in FIG. 1. In FIG. 1, the thermally treated glass article 100 includes a first surface 101, a thickness $t_1$, and a surface CS 110. The thermally treated glass article 100 exhibits a CS that decreases from the first surface 101 to a depth of layer 130, as defined herein, at which depth the stress changes from compressive to tensile stress and reaches a maximum central tension (CT) 120.

Thermal tempering is currently limited to thick glass-based articles (i.e., glass-based articles having a thickness $t_1$ of about 3 millimeters or greater) because, to achieve the thermal strengthening and the desired residual stresses, a sufficient thermal gradient must be formed between the core of such articles and the surface. Such thick articles are undesirable or not practical in many applications such as display (e.g., consumer electronics, including mobile phones, tablets, computers, navigation systems, and the like), architecture (e.g., windows, shower panels, countertops etc.), transportation (e.g., automotive, trains, aircraft, sea craft, etc.), appliance, or any application that requires superior fracture resistance but thin and light-weight articles.

Although chemical strengthening is not limited by the thickness of the glass-based article in the same manner as thermally tempering, known chemically strengthened glass-based articles do not exhibit the stress profile of thermally tempered glass-based articles. An example of a stress profile generated by chemical strengthening (e.g., by an ion exchange process), is shown in FIG. 2. In FIG. 2, the chemically strengthened glass-based article 200 includes a first surface 201, a thickness t2 and a surface CS 210. The glass-based article 200 exhibits a CS that decreases from the first surface 201 to a DOC 230, as defined herein, at which depth the stress changes from compressive to tensile stress and reaches a maximum CT 220. As shown in FIG. 2, such profiles exhibit a substantially flat CT region or CT region with a constant or near constant tensile stress along at least a portion of the CT region. Often, known chemically strengthened glass-based articles exhibit a lower maximum CT value, as compared to the maximum central value shown in FIG. 1.

There is a need for thin glass-based articles that exhibit improved properties, such as resistance to fracture due to dropping of the articles.

SUMMARY

A first aspect of this disclosure pertains to a glass-based article comprising a first surface and a second surface opposing the first surface defining a thickness (t) (mm); and compressive stress (CS) layer containing ion-exchanged potassium and ion-exchanged silver or ion-exchanged potassium and ion-exchanged copper, the CS layer defining a stress profile and extending from the first surface to a depth of compress (DOC), wherein the DOC is in a range from 0.1·t to 0.3·t, the CS at the first surface in a range from 300 MPa to 1500 MPa and defining a compressive stress profile including a spike region, a tail region and a knee region between the spike region and the tail region, wherein all points of the stress profile in the spike region comprise a tangent having a value that is in a range from −200 MPa/micrometer to −15 MPa/micrometer and all points in the tail region comprise a tangent having a value that is in a range from −3 MPa/micrometer to −0.01 MPa/micrometer.

Another aspect of this disclosure pertains to a method of making a glass-based article comprising ion-exchanging silver and potassium into a glass-based substrate comprising $Li_2O$ in a range from 0.1 mol % to 20 mol %, wherein the glass-based substrate comprises: a first surface and a second surface opposing the first surface defining a thickness (t) (mm) and the ion-exchanging results in a compressive stress (CS) layer containing ion-exchanged potassium and ion-exchanged silver or ion-exchanged potassium and ion-exchanged copper, the CS layer extending from the first surface to a depth of compress (DOC), wherein the DOC is in a range from 0.1·t to 0.3·t, the CS at the first surface in a range from 300 MPa to 1500 MPa and defining a compressive stress profile including a spike region, a tail region and a knee region between the spike region and the tail region, wherein all points of the stress profile in the spike region comprise a tangent having a value that is in a range from −200 MPa/micrometer to −15 MPa/micrometer and all points in the tail region comprise a tangent having a value that is in a range from −3 MPa/micrometer to −0.01 MPa/micrometer.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
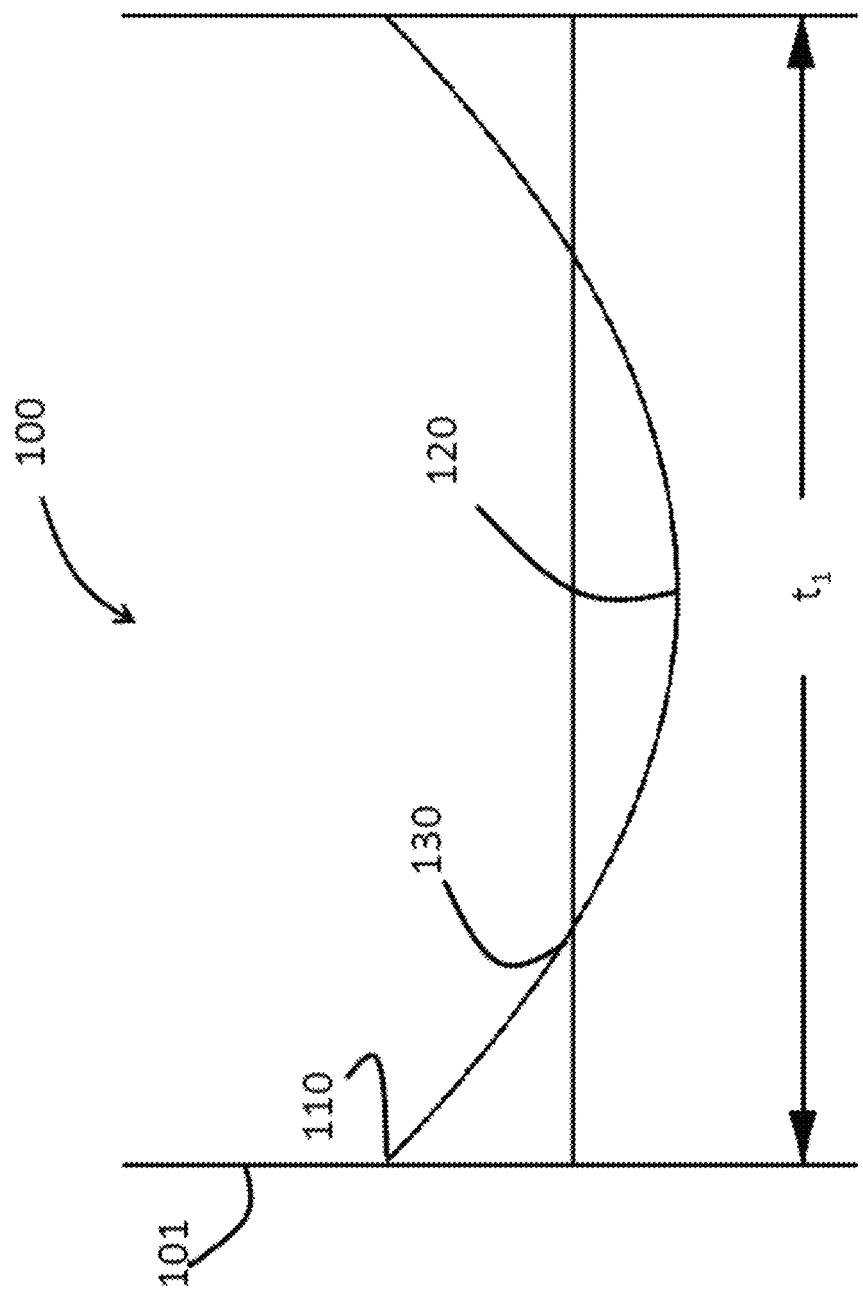
FIG. 1 is a cross-sectional view of a stress profile across a thickness of a known, thermally tempered glass article.
Figure 2:
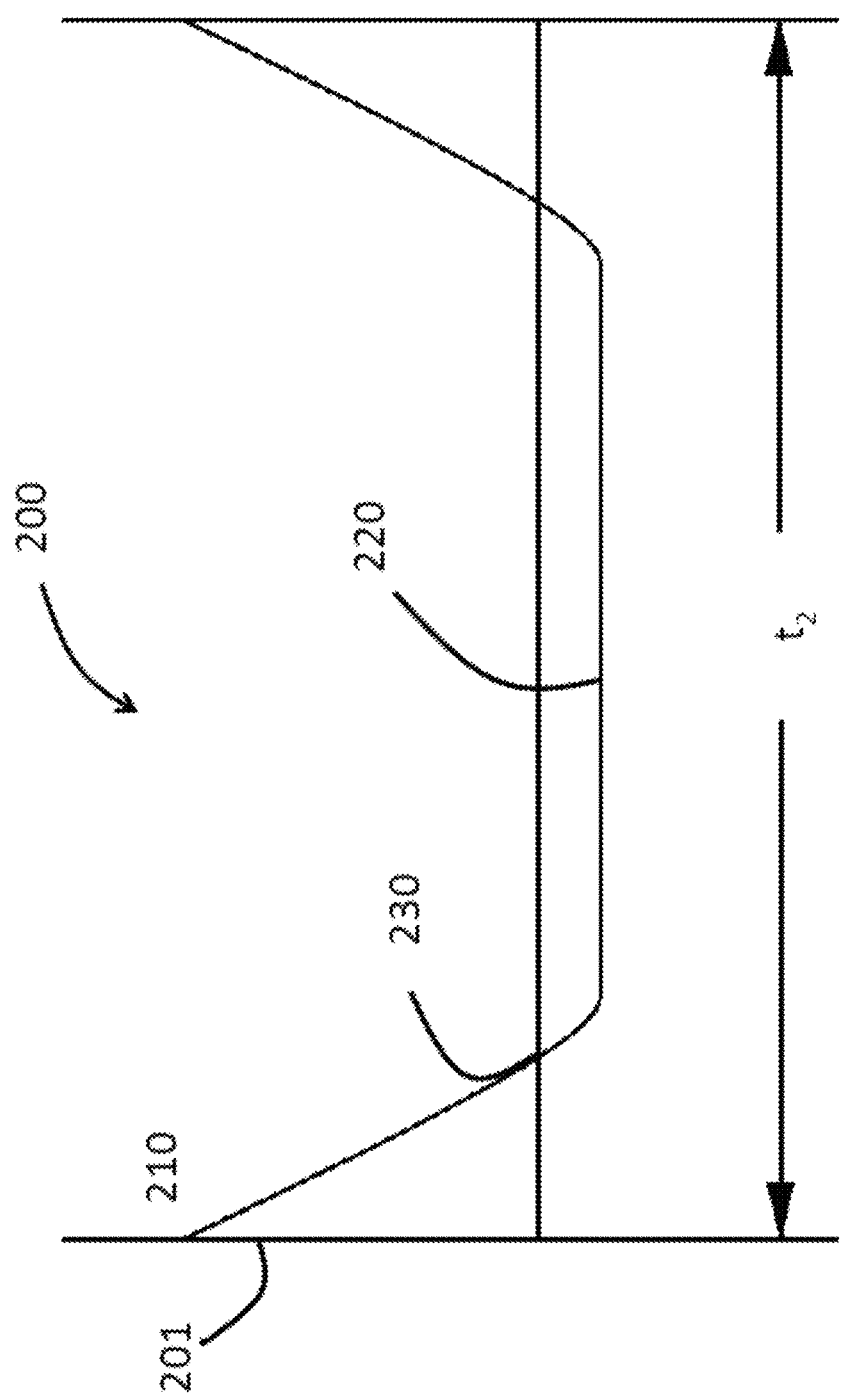
FIG. 2 is a cross-sectional view of a stress profile across a thickness of a known, chemically strengthened glass article.

Reference will now be made in detail to various embodiments, examples of which are illustrated in the accompanying examples and drawings.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass-based article" and "glass-based substrates" are used in their broadest sense to include any object made wholly or partly of glass. Glass-based articles include laminates of glass and non-glass materials, laminates of glass and crystalline materials, and glass-ceramics (including an amorphous phase and a crystalline phase). Unless otherwise specified, all compositions are expressed in terms of mole percent (mol %).

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Unless otherwise specified, all temperatures are expressed in terms of degrees Celsius (° C.).

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As used herein, DOC refers to the depth at which the stress within the glass-based article changes from compressive to tensile stress. At the DOC, the stress crosses from a positive (compressive) stress to a negative (tensile) stress (e.g., 130 in FIG. 1) and thus exhibits a stress value of zero.

As used herein, the terms "chemical depth", "chemical depth of layer" and "depth of chemical layer" may be used interchangeably and refer to the depth at which an ion of the metal oxide or alkali metal oxide (e.g., the metal ion or alkali metal ion) diffuses into the glass-based article and the depth at which the concentration of the ion reaches a minimum value, as determined by Electron Probe Micro-Analysis (EPMA) or Glow Discharge—Optical Emission Spectroscopy (GD-OES)). In particular, to assess the depth of $Na_2O$ diffusion or Na+ ion concentration may be determined using EPMA and a surface stress meter (described in more detail below).

According to the convention normally used in the art, compression is expressed as a negative (<0) stress and tension is expressed as a positive (>0) stress. Throughout this description, however, and unless otherwise, noted, CS is expressed as a positive or absolute value—i.e., as recited herein, CS=|CS|.

Described herein are thin, chemically strengthened glass-based articles that include glasses, such as silicate glasses including alkali-containing glass, and glass-ceramics that may be used as a cover glass for mobile electronic devices and touch-enabled displays. The glass-based articles may also be used in displays (or as display articles) (e.g., billboards, point of sale systems, computers, navigation systems, and the like), architectural articles (walls, fixtures, panels, windows, etc.), transportation articles (e.g., in automotive applications, trains, aircraft, sea craft, etc.), appliances (e.g., washers, dryers, dishwashers, refrigerators and the like), or any article that requires some fracture resistance.

In particular, the glass-based articles described herein are thin and exhibit stress profiles that are typically only achievable through tempering thick glass articles (e.g., having a thickness of about 2 mm or 3 mm or greater). The glass-based articles exhibit unique stress profiles along the thickness thereof. In some cases, the glass-based articles described herein exhibit a greater surface CS than tempered glass articles. In one or more embodiments, the glass-based articles have a compressive stress layer that extends deeper into the glass-based article (in which the CS decreases and increases more gradually than known chemically strengthened glass-based articles) such the glass-based article exhibits substantially improved fracture resistance, even when the glass-based article or a device including the same is dropped on a hard surface (e.g., granite) or a hard and rough surface (e.g., asphalt). The glass-based articles of one or more embodiments exhibit a greater maximum CT value than some known chemically strengthened glass substrates.

CS (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety.

DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions ("Potassium DOL") in such glass articles is measured by FSM. Potassium DOL is distinguished from DOC because it represents the depth of potassium penetration as a result of an ion exchange process. Potassium DOL is typically less than the DOC for the articles described herein.

Maximum CT values are measured using a scattered light polariscope (SCALP) technique known in the art. Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

As stated above, the glass-based articles described herein are chemically strengthened by ion exchange and exhibit stress profiles that are distinguished from those exhibited by known strengthened glass articles. In this disclosure, glass-based substrates are generally unstrengthened and glass-based articles generally refer to glass-based substrates that have been strengthened (by, for example, ion exchange). In this process, ions at or near the surface of the glass-based article are replaced by—or exchanged with—larger ions having the same valence or oxidation state. In those embodiments in which the glass-based article comprises an alkali aluminosilicate glass, ions in the surface layer of the glass and the larger ions are monovalent alkali metal cations, such as $Li^+$ (when present in the glass-based article), $Na^+$, $K^+$, $Rb^+$, and $Cs^+$. Additionally, monovalent cations in the surface layer may be replaced with monovalent cations other than alkali metal cations, such as $Ag^+$, $Cu^+$ or the like. In such embodiments, the monovalent ions (or cations) exchanged into the glass-based substrate generate a stress in the resulting glass-based article.

Ion exchange processes are typically carried out by immersing a glass-based substrate in a molten salt bath (or two or more molten salt baths) containing the larger ions to be exchanged with the smaller ions in the glass-based substrate. It should be noted that aqueous salt baths may also be utilized. In addition, the composition of the bath(s) according to one or more embodiments includes more than one type of larger ion (e.g., Na+ and K+) together with Ag+ and/or Cu+. It will be appreciated by those skilled in the art that parameters for the ion exchange process, including, but not limited to, bath composition and temperature, immersion time, the number of immersions of the glass-based article in a salt bath (or baths), use of multiple salt baths, additional steps such as annealing, washing, and the like, are generally determined by the composition of the glass-based article (including the structure of the article and any crystalline phases present) and the desired DOC and CS of the glass-based article that results from strengthening. By way of example, ion exchange of glass-based substrates may be achieved by immersion of the glass-based substrates in at least one molten bath containing a salt such as, but not limited to, nitrates, sulfates, and chlorides of the larger alkali metal ion and the silver and/or copper ion. Typical nitrates include $KNO_3$, $NaNO_3$, $LiNO_3$, $AgNO_3$, $CuNO_3$, and combinations thereof. The temperature of the molten salt bath typically is in a range from about 350° C. up to about 480° C., while immersion times range from about 15 minutes up to about 100 hours depending on glass thickness, bath temperature and glass (or monovalent ion) diffusivity. However, temperatures and immersion times different from those described above may also be used.

In one or more embodiments, the glass-based substrates may be immersed in a molten salt bath of 100% $NaNO_3$ or 100% KNO$_3$ having a temperature from about 350° C. to about 480° C. for times ranging from about 15 minutes up to about 100 hours depending on glass thickness, bath temperature and glass (or monovalent ion) diffusivity, followed by a bath containing 100% AgNO$_3$ or CuNO$_3$ having a temperature from about 350° C. to about 480° C. for times ranging from about 15 minutes up to about 100 hours depending on glass thickness, bath temperature and glass (or monovalent ion) diffusivity. In the molten baths described in this disclosure, all percentages are percent by weight. In some embodiments, the glass-based substrate may be immersed in a molten mixed salt bath having a temperature from about 350° C. to about 480° C. and including from about 5% to about 90% KNO$_3$ and from about 10% to about 95% NaNO$_3$ for times ranging from about 15 minutes up to about 100 hours depending on glass thickness, bath temperature and glass (or monovalent ion) diffusivity, followed by a bath containing 100% AgNO$_3$ or CuNO$_3$ having a temperature from about 350° C. to about 480° C. for times ranging from about 15 minutes up to about 100 hours depending on glass thickness, bath temperature and glass (or monovalent ion) diffusivity.

In one or more embodiments, the glass-based substrate may be immersed in a molten, mixed salt bath having a temperature from about 350° C. to about 480° C. for times ranging from about 15 minutes up to about 100 hours depending on glass thickness, bath temperature and glass (or monovalent ion) diffusivity, and including 99.95%, 99.9%, 99.85%, 99.8%, 99.75%, 99.7%, 99.65%, 99.6%, 99.55%, 99.5%, 99.45%, 99.4%, 99.35%, 99.3%, 99.25%, 99.2%, 99.15%, 99.1%, 99.05%, 99%, 98.95%, 98.9%, 98.85%, 98.8%, 98.75%, 98.7%, 98.65%, 98.6%, 98.55%, 98.5%, 98.45%, 98.4%, 98.35%, 98.3%, 98.25%, 98.2%, 98.15%, 98.1%, 98.05%, 98%, 97.95%, 97.9%, 97.85%, 97.8%, 97.75%, 97.7%, 97.65%, 97.6%, 97.55%, 97.5%, 97.45%, 97.4%, 97.35%, 97.3%, 97.25%, 97.2%, 97.15%, 97.1%, 97.05%, 97%, 96.95%, 96.9%, 96.85%, 96.8%, 96.75%, 96.7%, 96.65%, 96.6%, 96.55%, 96.5%, 96.45%, 96.4%, 96.35%, 96.3%, 96.25%, 96.2%, 96.15%, 96.1%, 96.05%, 96%, 95.95%, 95.9%, 95.85%, 95.8%, 95.75%, 95.7%, 95.65%, 95.6%, 95.55%, 95.5%, 95.45%, 95.4%, 95.35%, 95.3%, 95.25%, 95.2%, 95.15%, 95.1%, 95.05%, 95%, 94%, 93%, 92%, 91%, or 90% NaNO$_3$ (or sulfates or chlorides of Na), with the balance being AgNO$_3$ or CuNO$_3$ (or sulfates or chlorides of Ag or Cu). The glass-based substrate can then be immersed in a bath of having a temperature from about 350° C. to about 480° C., and including 99.95%, 99.9%, 99.85%, 99.8%, 99.75%, 99.7%, 99.65%, 99.6%, 99.55%, 99.5%, 99.45%, 99.4%, 99.35%, 99.3%, 99.25%, 99.2%, 99.15%, 99.1%, 99.05%, 99%, 98.95%, 98.9%, 98.85%, 98.8%, 98.75%, 98.7%, 98.65%, 98.6%, 98.55%, 98.5%, 98.45%, 98.4%, 98.35%, 98.3%, 98.25%, 98.2%, 98.15%, 98.1%, 98.05%, 98%, 97.95%, 97.9%, 97.85%, 97.8%, 97.75%, 97.7%, 97.65%, 97.6%, 97.55%, 97.5%, 97.45%, 97.4%, 97.35%, 97.3%, 97.25%, 97.2%, 97.15%, 97.1%, 97.05%, 97%, 96.95%, 96.9%, 96.85%, 96.8%, 96.75%, 96.7%, 96.65%, 96.6%, 96.55%, 96.5%, 96.45%, 96.4%, 96.35%, 96.3%, 96.25%, 96.2%, 96.15%, 96.1%, 96.05%, 96%, 95.95%, 95.9%, 95.85%, 95.8%, 95.75%, 95.7%, 95.65%, 95.6%, 95.55%, 95.5%, 95.45%, 95.4%, 95.35%, 95.3%, 95.25%, 95.2%, 95.15%, 95.1%, 95.05%, 95%, %, 94%, 93%, 92%, 91%, or 90% KNO$_3$ (or sulfates or chlorides of K), with the balance being AgNO$_3$ or CuNO$_3$ (or sulfates or chlorides of Ag or Cu). In some embodiments, the order can be reversed, where the glass-based substrate can be immersed in the potassium and silver (or copper)-containing salt bath first, followed by the sodium and silver (or copper)-containing salt bath. In some embodiments, the glass-based substrate is immersed in only the potassium and silver (or copper)-containing salt bath, or only in the sodium and silver (or copper)-containing salt bath.

In some embodiments, the glass-based substrate may be immersed in a molten, mixed salt bath having a temperature from about 350° C. to about 480° C., and including a sodium salt, a potassium salt and a silver (or copper) salt, each of the salts selected from nitrates, sulfates and chlorides. The glass-based substrate can then be immersed in a bath of having a temperature from about 350° C. to about 480° C. and including 10%, 9%, 8%, 7%, 6%, 5%, 4.95%, 4.9%, 4.85%, 4.8%, 4.75%, 4.7%, 4.65%, 4.6%, 4.55%, 4.5%, 4.45%, 4.4%, 4.35%, 4.3%, 4.25%, 4.2%, 4.15%, 4.1%, 4.05%, 4%, 3.95%, 3.9%, 3.85%, 3.8%, 3.75%, 3.7%, 3.65%, 3.6%, 3.55%, 3.5%, 3.45%, 3.4%, 3.35%, 3.3%, 3.25%, 3.2%, 3.15%, 3.1%, 3.05%, 3%, 2.95%, 2.9%, 2.85%, 2.8%, 2.75%, 2.7%, 2.65%, 2.6%, 2.55%, 2.5%, 2.45%, 2.4%, 2.35%, 2.3%, 2.25%, 2.2%, 2.15%, 2.1%, 2.05%, 2%, 1.95%, 1.9%, 1.85%, 1.8%, 1.75%, 1.7%, 1.65%, 1.6%, 1.55%, 1.5%, 1.45%, 1.4%, 1.35%, 1.3%, 1.25%, 1.2%, 1.15%, 1.1%, 1.05%, 1%, 0.95%, 0.9%, 0.85%, 0.8%, 0.75%, 0.7%, 0.65%, 0.6%, 0.55%, 0.5%, 0.45%, 0.4%, 0.35%, 0.3%, 0.25%, 0.2%, 0.15%, 0.1%, or 0.05%, or 95% AgNO$_3$ or AgNO$_3$, with the balance being a mixture of KNO$_3$/NaNO$_3$ in a ratio of KNO$_3$/NaNO$_3$ of about 20/1, 15/1, 14/1, 13/1, 12/1, 11/1, 10/1, 9/1, 8/1, 7/1, 6/1, 5/1, 4/1, 3/1, 2/1 1.5/1, 1.4/1, 1.3/1, 1.2/1, 1.1/1, 1/1, 1/1.1, 1/1.2, 1/1.3, 1/1.4, 1.5, 1/2, 1/3, 1/4, 1/5, 1/6, 1/7, 1/8, 1/9, 1/10, 1/11, 1/12, 1/13, 1/14, 1/15, or 1/20.

Ion exchange conditions can be tailored to provide a "spike" or to increase the slope of the stress profile at or near the surface of the resulting glass-based article. This spike can be achieved by single bath or multiple baths, with the bath(s) having a single composition or mixed composition, due to the unique properties of the glass compositions used in the glass-based articles described herein.

Figure 3:
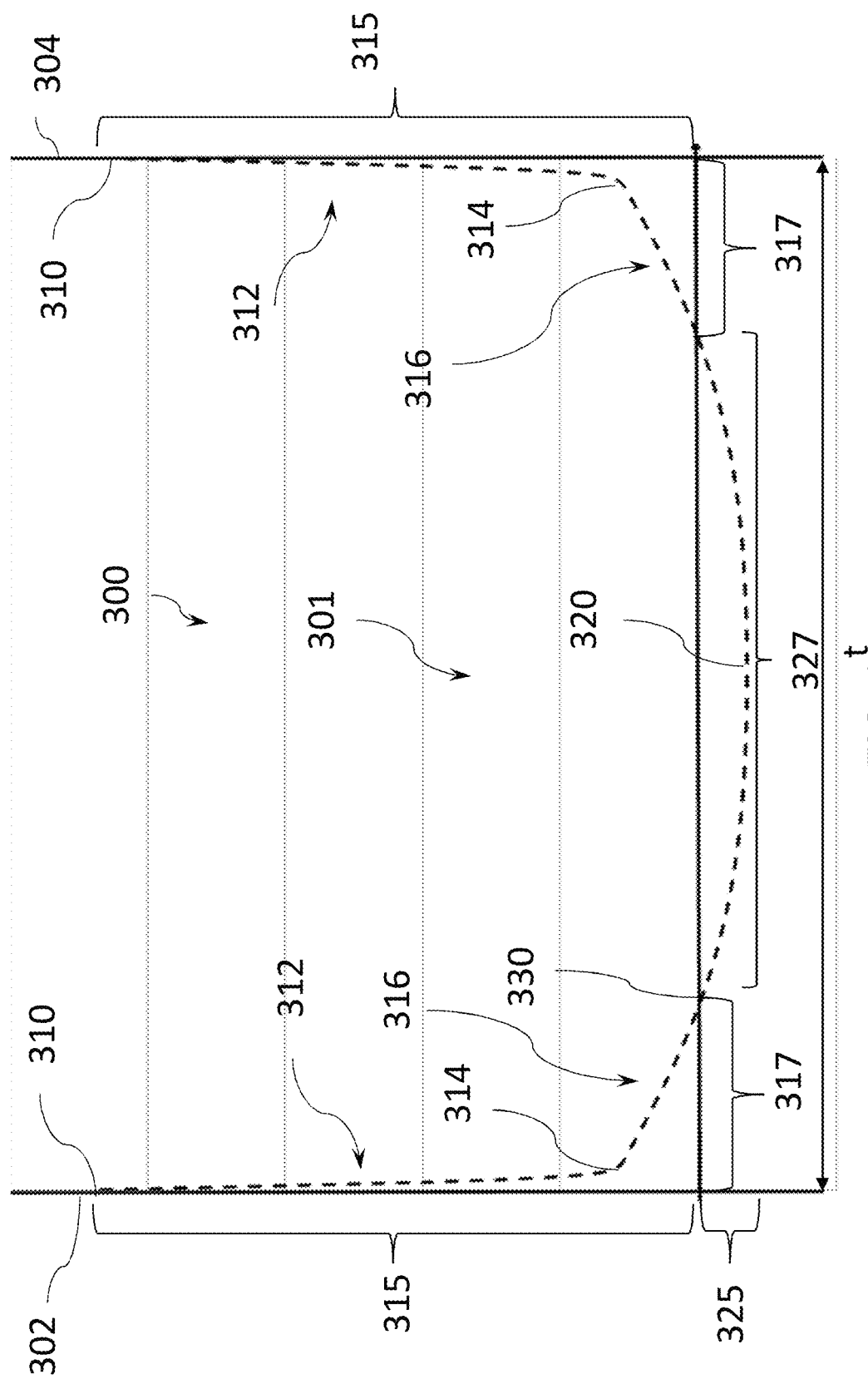
FIG. 3 is a cross-sectional view of stress profile across a thickness of a chemically strengthened glass-based article according to one or more embodiments of this disclosure.

As illustrated by FIG. 3, a glass-based article 300 according to one or more embodiments includes a first surface 302 and a second surface 304 opposing the first surface, defining a thickness t. In one or more embodiments, the thickness t may be about 3 millimeters or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter).

The glass-based article 300 includes a stress profile 301 that extends from the first surface 302 to the second surface 304 (or along the entire dimension of the thickness t). In the embodiment shown in FIG. 3, the stress profile 301 as measured by SCALP or RNF as described herein is illustrated. The x-axis represents the stress value and the y-axis represents the thickness or depth within the glass-based article.

As illustrated in FIG. 3, the stress profile 301 includes a CS layer 315 (with a surface CS 310), a CT layer 325 (with a maximum CT 320) and a DOC 330 at which the stress profile 301 turns from compressive to tensile. The CS layer has an associated depth or length 317 extending from a surface 302, 304 to the DOC 330. The CT layer 325 also has an associated depth or length 327 (CT region or layer).

The surface CS 310 in one or more embodiments is about 300 MPa or greater or about 450 MPa or greater (e.g., in a range of about 300 MPa and 1500 MPa, in a range of about 300 MPa and 1400 MPa, in a range of about 300 MPa and 1300 MPa, in a range of about 300 MPa and 1200 MPa, in a range of about 300 MPa and 1100 MPa, in a range of about 300 MPa and 1000 MPa, in a range of about 350 MPa and 1500 MPa, in a range of about 350 MPa and 1400 MPa, in a range of about 350 MPa and 1300 MPa, in a range of about 350 MPa and 1200 MPa, in a range of about 350 MPa and 1100 MPa, in a range of about 350 MPa and 1000 MPa, in a range of about 400 MPa and 1500 MPa, in a range of about 400 MPa and 1400 MPa, in a range of about 400 MPa and 1300 MPa, in a range of about 400 MPa and 1200 MPa, in a range of about 400 MPa and 1100 MPa, in a range of about 400 MPa and 1000 MPa, in a range of about 450 MPa and 1500 MPa, in a range of about 450 MPa and 1400 MPa, in a range of about 450 MPa and 1300 MPa, in a range of about 450 MPa and 1200 MPa, in a range of about 450 MPa and 1100 MPa, in a range of about 450 MPa and 1000 MPa, in a range of about 500 MPa and 1500 MPa, in a range of about 500 MPa and 1400 MPa, in a range of about 500 MPa and 1300 MPa, in a range of about 500 MPa and 1200 MPa, in a range of about 500 MPa and 1100 MPa, in a range of about 500 MPa and 1000 MPa, in a range of about 550 MPa and 1500 MPa, in a range of about 550 MPa and 1400 MPa, in a range of about 550 MPa and 1300 MPa, in a range of about 550 MPa and 1200 MPa, in a range of about 550 MPa and 1100 MPa, in a range of about 550 MPa and 1000 MPa, in a range of about 600 MPa and 1500 MPa, in a range of about 600 MPa and 1400 MPa, in a range of about 600 MPa and 1300 MPa, in a range of about 600 MPa and 1200 MPa, in a range of about 600 MPa and 1100 MPa, in a range of about 600 MPa and 1000 MPa, in a range of about 700 MPa and 1500 MPa, in a range of about 700 MPa and 1400 MPa, in a range of about 700 MPa and 1300 MPa, in a range of about 700 MPa and 1200 MPa, in a range of about 700 MPa and 1100 MPa, in a range of about 700 MPa and 1000 MPa). The surface CS 310 may be up to about 900 MPa, up to about 1000 MPa, up to about 1100 MPa, or up to about 1200 MPa. The surface CS values provided herein may also comprise the maximum CS.

The maximum CT 320 may be positioned at a range from about $0.3 \cdot t$ to about $0.7 \cdot t$, or from about $0.25 \cdot t$ to about $0.75 \cdot t$, or from about $0.2 \cdot t$ to about $0.8 \cdot t$. It should be noted that any one or more of surface CS 310 and maximum CT 320 may be dependent on the thickness of the glass-based article. For example, glass-based articles having at thickness of about 0.8 mm may have a maximum CT of about 75 MPa or less. When the thickness of the glass-based article decreases, the maximum CT may increase. In other words, the maximum CT increases with decreasing thickness (or as the glass-based article becomes thinner).

In some embodiments, surface CS may be 1.5 times (or 2 times or 2.5 times) the maximum CT or greater. In some embodiments, the surface CS may be up to about 48 times the maximum CT, up to 40 times the maximum CT, up to 20 times the maximum CT, 10 up to times the maximum CT, or up to 8 times the maximum CT. The surface CS may be in the range from about 5 times up to about 50 times the maximum CT.

In one or more embodiments, the stress profile 301 comprises a maximum CS, which is typically the surface CS 310 and can be found at one or both of the first surface 302 and the second surface 304. In one or more embodiments, the CS layer or region 315 extends along a portion of the thickness to the DOC 317 and a maximum CT 320. In one or more embodiments, the DOC 317 may be about $0.02 \cdot t$ or greater. For example, the DOC 317 may be in range of about $0.03 \cdot t$ and $0.4 \cdot t$, in range of about $0.03 \cdot t$ and $0.35 \cdot t$, in range of about $0.03 \cdot t$ and $0.3 \cdot t$, in range of about $0.03 \cdot t$ and $0.25 \cdot t$, in range of about $0.03 \cdot t$ and $0.2 \cdot t$, in range of about $0.04 \cdot t$ and $0.4 \cdot t$, in range of about $0.04 \cdot t$ and $0.35 \cdot t$, in range of about $0.04 \cdot t$ and $0.3 \cdot t$, in range of about $0.04 \cdot t$ and $0.25 \cdot t$, in range of about $0.04 \cdot t$ and $0.2 \cdot t$, in range of about $0.05 \cdot t$ and $0.5 \cdot t$, in range of about $0.05 \cdot t$ and $0.35 \cdot t$, in range of about $0.05 \cdot t$ and $0.3 \cdot t$, in range of about $0.05 \cdot t$ and $0.25 \cdot t$, in range of about $0.05 \cdot t$ and $0.2 \cdot t$. In some embodiments, the DOC 317 is less than the chemical depth. The chemical depth may be about $0.4 \cdot t$ or greater, $0.5 \cdot t$ or greater, about $55 \cdot t$ or greater, or about $0.6 \cdot t$ or greater than the DOC 317.

In one or more embodiments, the stress profile may be described as having a first region, which is referred to herein as a spike region 312 extending from the surface CS 310 to a knee 314. In one or more embodiments, the stress profile includes a second region 316, which is referred to as a tail region 316. In one or more embodiments, the stress profile includes a knee region 314, which is a transition region between the spike region and the tail region 316.

In one or more embodiments, all points of the stress profile in the spike region 312 comprise a tangent having a value that is in a range of −200 MPa/micrometer and −9 MPa/micrometer, in a range of −200 MPa/micrometer and −10 MPa/micrometer, in a range of −200 MPa/micrometer and −11 MPa/micrometer, in a range of −200 MPa/micrometer and −12 MPa/micrometer, in a range of −200 MPa/micrometer and −13 MPa/micrometer, in a range of −200 MPa/micrometer and −14 MPa/micrometer, in a range of −200 MPa/micrometer and −15 MPa/micrometer, in a range of −200 MPa/micrometer and −20 MPa/micrometer, in a range of −200 MPa/micrometer and −25 MPa/micrometer, in a range of −200 MPa/micrometer and −30 MPa/micrometer, in a range of −200 MPa/micrometer and −35 MPa/micrometer, in a range of −200 MPa/micrometer and −40 MPa/micrometer, in a range of −200 MPa/micrometer and −45 MPa/micrometer, in a range of −200 MPa/micrometer and −50 MPa/micrometer, in a range of −200 MPa/micrometer and −55 MPa/micrometer, in a range of −200 MPa/micrometer and −60 MPa/micrometer, in a range of −200 MPa/micrometer and −65 MPa/micrometer, in a range of −200 MPa/micrometer and −70 MPa/micrometer, in a range of −200 MPa/micrometer and −75 MPa/micrometer, in a range of −200 MPa/micrometer and −80 MPa/micrometer, in a range of −200 MPa/micrometer and −85 MPa/micrometer, in a range of −200 MPa/micrometer and −90 MPa/micrometer, in a range of −200 MPa/micrometer and −95 MPa/micrometer, or in a range of −200 MPa/micrometer and −100 MPa/micrometer, and all points in the tail region 316 comprise a tangent having a value that is in a range of −3 MPa/micrometer and −0.01 MPa/micrometer, in a range of −2.5 MPa/micrometer and −0.01 MPa/micrometer, in a range of −2 MPa/micrometer and −0.01 MPa/micrometer, in a range of −1.5 MPa/micrometer and −0.01 MPa/micrometer, in a range of −1 MPa/micrometer and −0.01 MPa/micrometer, or in a range of −0.5 MPa/micrometer and −0.01 MPa/micrometer. In some embodiments, a tangent may be described and used interchangeably with "local gradient," which is defined as the change in stress magnitude as a function of depth, as the depth increment approaches zero.

In one or more embodiments, the spike region 312 extends from the first surface 302 to 0.1·t. For example, the spike region 312 may extend from the first surface 302 to 0.09·t, from the first surface 302 to 0.08·t, from the first surface 302 to 0.08·t, from the first surface 302 to 0.07·t, from the first surface 302 to 0.06·t, from the first surface 302 to 0.05·t, from the first surface 302 to 0.04·t, from the first surface 302 to 0.03·t, or from the first surface 302 to 0.02·t, and the tail region is in a range of 0.05·t and 0.5·t, in a range of 0.05·t and 0.4·t, in a range of 0.05·t and 0.3·t, in a range of 0.05·t and 0.2·t, or in a range of 0.05·t and 0.1·t.

In one or more embodiments, the stress profile 301 is such that there is a compressive stress in the tail region of greater than 100 MPa, greater than 90 MPa, greater than 80 MPa, greater than 70 MPa, greater than 60 MPa or greater than 50 MPa at 0.05·t. In one or more embodiments, the stress profile 301 is such that there is a compressive stress in the tail region of greater than 100 MPa, greater than 90 MPa, greater than 80 MPa, greater than 70 MPa, greater than 60 MPa, greater than 50 MPa, greater than 40 MPa or greater than 30 MPa at 0.1·t.

In one or more embodiments, all points of the stress profile in the tail region form a power-law profile having a power exponent, wherein the power exponent is in a range of about 1.2 to 3.4. In some embodiments, the tail region power exponent is between about 1.3 and 2.8. As used herein, "power-law function" refers to a curve in which the stress is exponentially proportional to the depth or thickness. It is thought that profiles with lower power coefficients generally have smaller tangents in the tail region, typically below 1 MPa/micrometer. Thus, according to one or more embodiments, methods are provided that include two or more ion exchange steps including varying the concentration ratio between Na and K for a duration to achieve the stress profiles described herein. In a Li-containing glass, even a single IOX diffusion creates a spike and a tail in the stress profile. This is thought to be due to the fact that the glass containing different amounts of Li, Na and K is exchanged simultaneously at different diffusion rates. Due to minor local deviations between the actual deep stress profile and the power-low approximation, as well as precision limitations in the point-to-point stress profile measurements, up to 10-15 MPa difference between the actual stress at the bottom of the spike and the knee stress of the model spiked power profile is possible.

In one or more embodiments, the glass-based article includes a stress profile that is substantially free or free of any linear segments that extend in a depth direction or along at least a portion of the thickness t of the glass-based article. In other words, the stress profile is substantially continuously increasing or decreasing along the thickness t. In some embodiments, the stress profile is substantially free or free of any linear segments in a depth direction having a length of about 10 micrometers or more, about 50 micrometers or more, or about 100 micrometers or more, or about 200 micrometers or more. As used herein, the term "linear" refers to a slope having an absolute magnitude of less than about 5 MPa/micrometer, or less than about 2 MPa/micrometer along the linear segment. In some embodiments, one or more portions of the stress profile that are substantially free or free of any linear segments in a depth direction are present at depths within the glass-based article of about 5 micrometers or greater (e.g., 10 micrometers or greater, or 15 micrometers or greater) from either one or both the first surface or the second surface. For example, along a depth of about 0 micrometers to less than about 5 micrometers from the first surface, the stress profile may include linear segments, but from a depth of about 5 micrometers or greater from the first surface, the stress profile may be substantially free or free of linear segments.

In some embodiments, the stress profile may be modified by heat treatment. In such embodiments, the heat treatment may occur before any ion-exchange processes, between ion-exchange processes, or after all ion-exchange processes. In some embodiments, the heat treatment may result reduce the slope of the stress profile at or near the surface. In some embodiments, where a steeper or greater slope is desired at the surface, an ion-exchange process after the heat treatment may be utilized to provide a "spike" or to increase the slope of the stress profile at or near the surface.

In one or more embodiments, the stress profile is generated due to a non-zero concentration of a metal oxide(s) that varies along a portion of the thickness. As mentioned above, the variation in metal oxide concentration may be referred to herein as a metal oxide concentration gradient.

The concentration of metal oxide may include more than one metal oxide (e.g., a combination of $Na_2O$ and $K_2O$ and $Ag_2O$ (or $Cu_2O$). In some embodiments, where two metal oxides are utilized and where the radius of the ions differ from one or another, the concentration of ions having a larger radius is greater than the concentration of ions having a smaller radius at shallow depths, while the at deeper depths, the concentration of ions having a smaller radius is greater than the concentration of ions having larger radius. For example, where a single Na- and K-containing bath is used in the ion exchange process, the concentration of K+ ions in the glass-based article is greater than the concentration of Na+ ions at shallower depths, while the concentration of Na+ is greater than the concentration of K+ ions at deeper depths. This is due, in part, due to the size of the monovalent ions that are exchanged into the glass for smaller monovalent ions. In such glass-based articles, the area at or near the surface comprises a greater CS due to the greater amount of larger ions (i.e., K+ ions) at or near the surface. This greater CS may be exhibited by a stress profile having a steeper slope at or near the surface (i.e., a spike in the stress profile at the surface).

The concentration gradient or variation of one or more metal oxides is created by chemically strengthening a glass-based substrate, as previously described herein, in which a plurality of first metal ions in the glass-based substrate is exchanged with a plurality of second metal ions. The first ions may be ions of lithium, sodium, potassium, rubidium and silver (or copper). The second metal ions may be ions of one of sodium, potassium, rubidium, cesium and silver (or copper), with the proviso that the second alkali metal ion has an ionic radius greater than the ionic radius than the first alkali metal ion. The second metal ion is present in the glass-based substrate as an oxide thereof (e.g., $Na_2O$, $K_2O$, $Rb_2O$, $Cs_2O$, $Ag_2O$ (or $Cu_2O$), or a combination thereof).

In one or more embodiments, the metal oxide concentration gradient extends through a substantial portion of the thickness t or the entire thickness t of the glass-based article, including the CT layer 327. In one or more embodiments, the concentration of the metal oxide is about 0.5 mol % or greater in the CT layer 327. In some embodiments, the concentration of the metal oxide may be about 0.5 mol % or greater (e.g., about 1 mol % or greater) along the entire thickness of the glass-based article, and is greatest at the first surface 302 and/or the second surface 304 and decreases substantially constantly to a point between the first surface 302 and the second surface 304. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. In some embodiments, the lowest concentration in the particular metal oxide is in the CT layer 327. The total concentration of the particular metal oxide in the glass-based article may be in the range from about 1 mol % to about 20 mol %.

In one or more embodiments, the glass-based article includes a first metal oxide concentration and a second metal oxide concentration, such that the first metal oxide concentration is in the range from about 0 mol % to about 15 mol % along a first thickness range from about 0 t to about 0.5 t, and the second metal oxide concentration is in the range from about 0 mol % to about 10 mol % from a second thickness range from about 0 micrometers to about 25 micrometers (or from about 0 micrometers to about 12 micrometers); however, the concentration of one or both the first metal oxide and the second metal oxide is non-zero along a substantial portion or the entire thickness of the glass-based article. The glass-based article may include an optional third metal oxide concentration. The first metal oxide may include $Na_2O$ and $Ag_2O$ (or $Cu_2O$), while the second metal oxide may include $K_2O$.

The concentration of the metal oxide may be determined from a baseline amount of the metal oxide in the glass-based article prior to being modified to include the concentration gradient of such metal oxide.

In some embodiments, the glass-based article comprises a high liquidus viscosity that enables the formation of the glass-based articles via down-draw techniques (e.g., fusion draw, slot draw, and other like methods), which can provide high precision surface smoothness. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature). In general, the glass-based articles (or the compositions used to form such articles) described herein have a liquidus viscosity of about 100 kilopoise (kP) or greater. In scenarios where a higher liquidus viscosity is desired for down-draw processability, the glass-based articles (or the compositions used to form such articles) exhibit a liquidus viscosity of at least about 200 kP (e.g., about 600 kP or greater).

Figure 8:
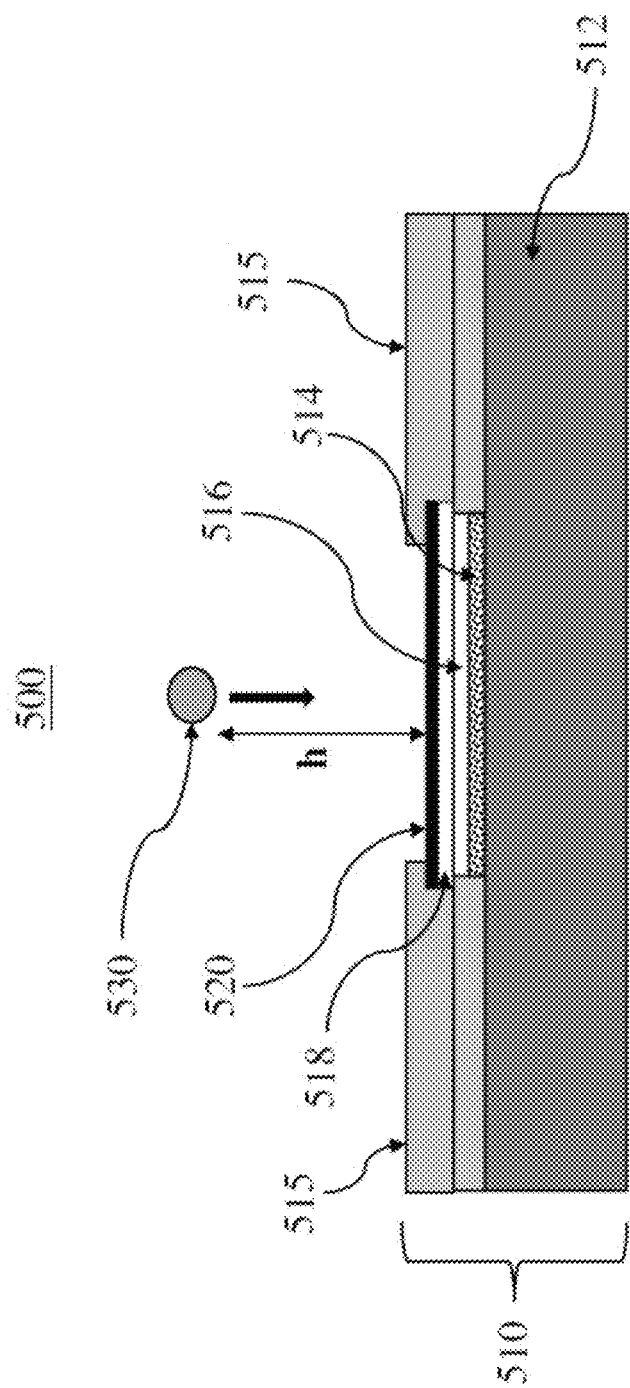
FIG. 8 is a schematic cross-sectional view of an embodiment of the apparatus that is used to perform the inverted ball on sandpaper (IBoS) test described in the present disclosure.
Figure 9:
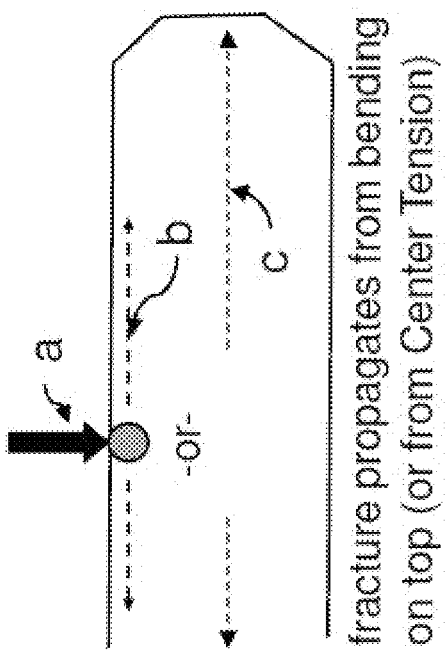
FIG. 9 is a schematic cross-sectional representation of the dominant mechanism for failure due to damage introduction plus bending that typically occurs in glass-based articles that are used in mobile or hand held electronic devices.

In some embodiments, the glass-based articles described herein may be described in terms of performance in an inverted ball on sandpaper (IBoS) test. The IBoS test is a dynamic component level test that mimics the dominant mechanism for failure due to damage introduction plus bending that typically occurs in glass-based articles that are used in mobile or hand held electronic devices, as schematically shown in FIG. 8. In the field, damage introduction (a in FIG. 9) occurs on the top surface of the glass-based article. Fracture initiates on the top surface of the glass-based article and damage either penetrates the glass-based article (b in FIG. 9) or the fracture propagates from bending on the top surface or from the interior portions of the glass-based article (c in FIG. 9). The IBoS test is designed to simultaneously introduce damage to the surface of the glass and apply bending under dynamic load. In some instances, the glass-based article exhibits improved drop fracture performance when it includes a compressive stress than if the same glass-based article does not include a compressive stress.

Figure 7:
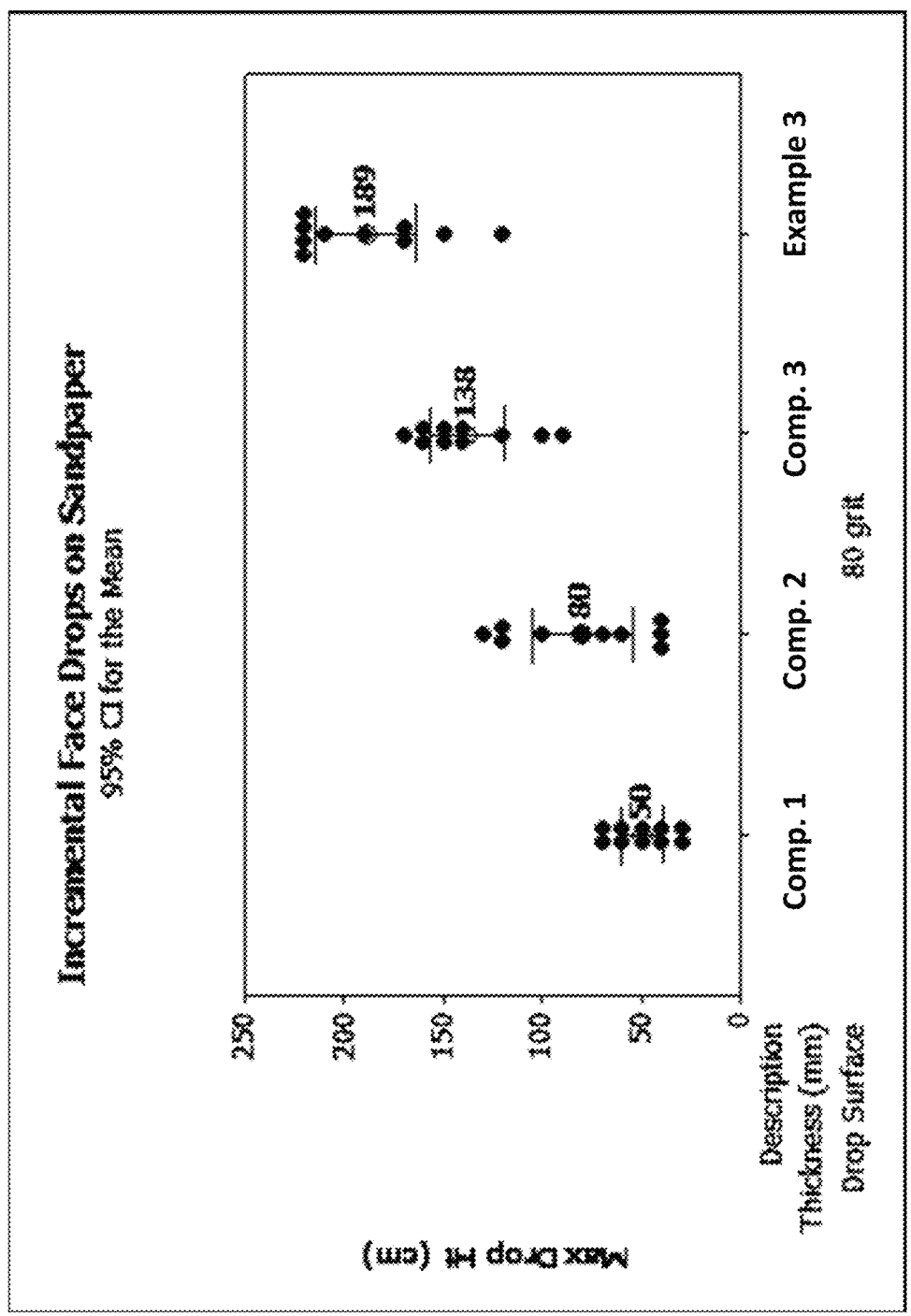
FIG. 7 is a graph showing results for inverted ball on sandpaper tests for Comparative Examples 1-3 and Example 3.

An IBoS test apparatus is schematically shown in FIG. 7. Apparatus 500 includes a test stand 510 and a ball 530. Ball 530 is a rigid or solid ball such as, for example, a stainless steel ball, or the like. In one embodiment, ball 530 is a 4.2 gram stainless steel ball having diameter of 10 mm. The ball 530 is dropped directly onto the glass-based article sample 518 from a predetermined height h. Test stand 510 includes a solid base 512 comprising a hard, rigid material such as granite or the like. A sheet 514 having an abrasive material disposed on a surface is placed on the upper surface of the solid base 512 such that surface with the abrasive material faces upward. In some embodiments, sheet 514 is sandpaper having a 30 grit surface and, in other embodiments, a 180 grit surface. The glass-based article sample 518 is held in place above sheet 514 by sample holder 515 such that an air gap 516 exists between glass-based article sample 518 and sheet 514. The air gap 516 between sheet 514 and glass-based article sample 518 allows the glass-based article sample 518 to bend upon impact by ball 530 and onto the abrasive surface of sheet 514. In one embodiment, the glass-based article sample 218 is clamped across all corners to keep bending contained only to the point of ball impact and to ensure repeatability. In some embodiments, sample holder 514 and test stand 510 are adapted to accommodate sample thicknesses of up to about 2 mm. The air gap 516 is in a range from about 50 μm to about 100 μm. Air gap 516 is adapted to adjust for difference of material stiffness (Young's modulus, Emod), but also includes the Young's modulus and thickness of the sample. An adhesive tape 520 may be used to cover the upper surface of the glass-based article sample to collect fragments in the event of fracture of the glass-based article sample 518 upon impact of ball 530.

Various materials may be used as the abrasive surface. In a one particular embodiment, the abrasive surface is sandpaper, such as silicon carbide or alumina sandpaper, engineered sandpaper, or any abrasive material known to those skilled in the art for having comparable hardness and/or sharpness. In some embodiments, sandpaper having 30 grit may be used, as it has a surface topography that is more consistent than either concrete or asphalt, and a particle size and sharpness that produces the desired level of specimen surface damage.

Figure 10:
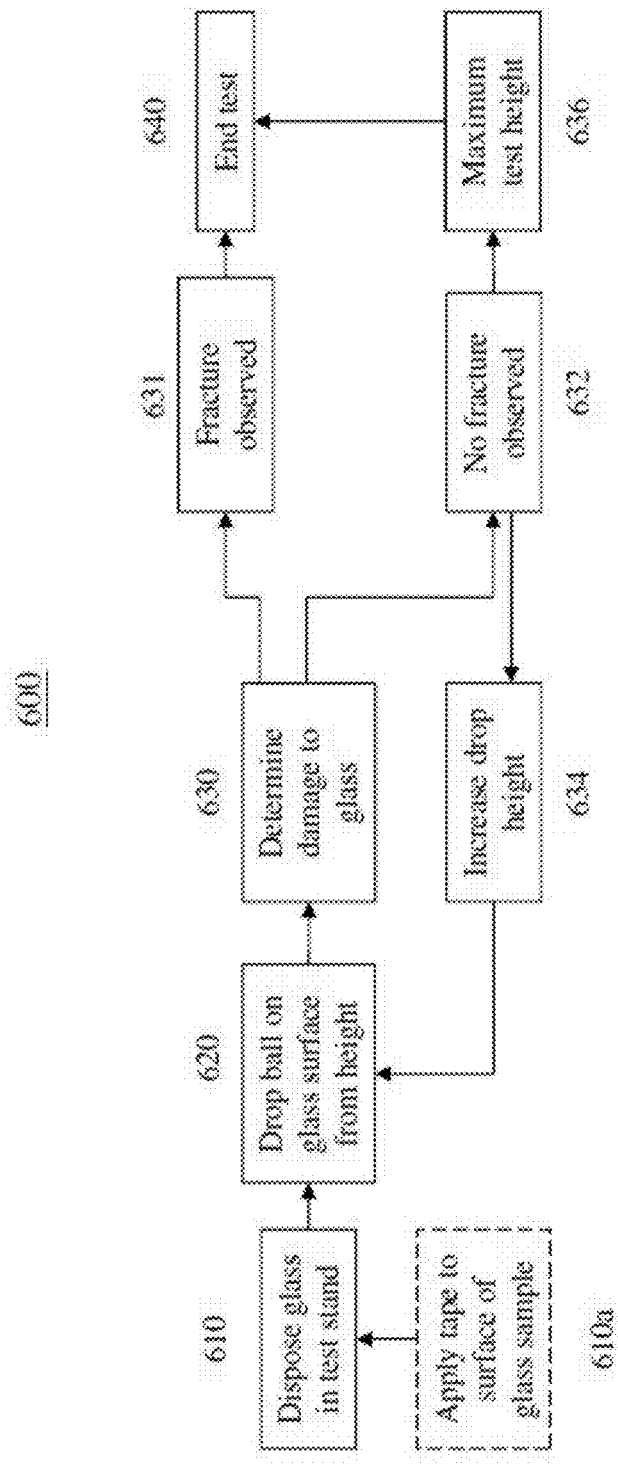
FIG. 10 is a flow chart for a method of conducting the IBoS test in the apparatus described herein.

In one aspect, a method 600 of conducting the IBoS test using the apparatus 500 described hereinabove is shown in FIG. 10. In Step 610, a glass-based article sample (218 in FIG. 10) is placed in the test stand 510, described previously and secured in sample holder 515 such that an air gap 516 is formed between the glass-based article sample 518 and sheet 514 with an abrasive surface. Method 600 presumes that the sheet 514 with an abrasive surface has already been placed in test stand 510. In some embodiments, however, the method may include placing sheet 514 in test stand 510, such that the surface with abrasive material faces upward. In some embodiments (Step 610a), an adhesive tape 520 is applied to the upper surface of the glass-based article sample 518 prior to securing the glass-based article sample 518 in the sample holder 510.

In Step 520, a solid ball 530 of predetermined mass and size is dropped from a predetermined height h onto the upper surface of the glass-based article sample 518, such that the ball 530 impacts the upper surface (or adhesive tape 520 affixed to the upper surface) at approximately the center (i.e., within 1 mm, or within 3 mm, or within 5 mm, or within 10 mm of the center) of the upper surface. Following impact in Step 520, the extent of damage to the glass-based article sample 518 is determined (Step 630). As previously described hereinabove, herein, the term "fracture" means that a crack propagates across the entire thickness and/or entire surface of a substrate when the substrate is dropped or impacted by an object.

In method 600, the sheet 518 with the abrasive surface may be replaced after each drop to avoid "aging" effects that have been observed in repeated use of other types (e.g., concrete or asphalt) of drop test surfaces.

Various predetermined drop heights h and increments are typically used in method 600. The test may, for example, utilize a minimum drop height to start (e.g., about 10-20 cm). The height may then be increased for successive drops by either a set increment or variable increments. The test described in method 600 is stopped once the glass-based article sample 518 breaks or fractures (Step 631). Alternatively, if the drop height h reaches the maximum drop height (e.g., about 100 cm) without fracture, the drop test of method 300 may also be stopped, or Step 520 may be repeated at the maximum height until fracture occurs.

In some embodiments, IBoS test of method 600 is performed only once on each glass-based article sample 518 at each predetermined height h. In other embodiments, however, each sample may be subjected to multiple tests at each height.

If fracture of the glass-based article sample 518 has occurred (Step 631 in FIG. 10), the IBoS test according to method 600 is ended (Step 640). If no fracture resulting from the ball drop at the predetermined drop height is observed (Step 632), the drop height is increased by a predetermined increment (Step 634)—such as, for example 5, 10, or 20 cm—and Steps 620 and 630 are repeated until either sample fracture is observed (631) or the maximum test height is reached (636) without sample fracture. When either Step 631 or 636 is reached, the test according to method 600 is ended.

When subjected to the inverted ball on sandpaper (IBoS) test described above, embodiments of the glass-based article described herein have at least about a 60% survival rate when the ball is dropped onto the surface of the glass from a height of 100 cm. For example, a glass-based article is described as having a 60% survival rate when dropped from a given height when three of five identical (or nearly identical) samples (i.e., having approximately the same composition and, when strengthened, approximately the same compressive stress and depth of compression or compressive stress layer, as described herein) survive the IBoS drop test without fracture when dropped from the prescribed height (here 100 cm). In other embodiments, the survival rate in the 100 cm IBoS test of the glass-based articles that are strengthened is at least about 70%, in other embodiments, at least about 80%, and, in still other embodiments, at least about 90%. In other embodiments, the survival rate of the strengthened glass-based articles dropped from a height of 100 cm in the IBoS test is at least about 60%, in other embodiments, at least about 70%, in still other embodiments, at least about 80%, and, in other embodiments, at least about 90%. In one or more embodiments, the survival rate of the strengthened glass-based articles dropped from a height of 150 cm, 160 cm, 170 cm, or 180 cm in the IBoS test is at least about 60%, in other embodiments, at least about 70%, in still other embodiments, at least about 80%, and, in other embodiments, at least about 90%.

To determine the survivability rate of the glass-based articles when dropped from a predetermined height using the IBoS test method and apparatus described hereinabove, at least five identical (or nearly identical) samples (i.e., having approximately the same composition and, if strengthened, approximately the same compressive stress and depth of compression or layer) of the glass-based articles are tested, although larger numbers (e.g., 10, 20, 30, etc.) of samples may be subjected to testing to raise the confidence level of the test results. Each sample is dropped a single time from the predetermined height (e.g., 100 cm or 150 cm) or, alternatively, dropped from progressively higher heights without fracture until the predetermined height is reached, and visually (i.e., with the naked eye) examined for evidence of fracture (crack formation and propagation across the entire thickness and/or entire surface of a sample). A sample is deemed to have "survived" the drop test if no fracture is observed after being dropped from the predetermined height, and a sample is deemed to have "failed (or "not survived") if fracture is observed when the sample is dropped from a height that is less than or equal to the predetermined height. The survivability rate is determined to be the percentage of the sample population that survived the drop test. For example, if 7 samples out of a group of 10 did not fracture when dropped from the predetermined height, the survivability rate of the glass would be 70%.

The glass-based articles described herein may be transparent. In one or more the glass-based article may have a thickness of about 1 millimeter or less and exhibit a transmittance of about 88% or greater over a wavelength in the range from about 380 nm to about 780 nm. In one or more embodiments, the glass-based articles exhibit a drop performance which averages greater than 100 cm when an 80 grit paper is used for a glass-based article of 0.8 mm is tested with a 4.2 gram stainless steel ball having diameter of 10 mm.

Choice of substrates not particularly limited. In some examples, the glass-based article may be described as having a high cation diffusivity for ion exchange. In one or more embodiments, the glass or glass-ceramic has fast ion-exchange capability, i.e., where diffusivity is greater than 500 $\mu m^2/hr$ or may be characterized as greater than 450 $\mu m^2/$ hour at 460° C. In one or more embodiments, the glass or glass-ceramic exhibits a sodium ion diffusivity that is about 450 $\mu m^2$/hour or greater at 460° C. or is about 500 $\mu m^2$/hour or greater at 460° C. In one or more embodiments, the glass or glass-ceramic exhibits a potassium ion diffusivity that is about 450 $\mu m^2$/hour or greater at 460° C. or is about 500 $\mu m^2$/hour or greater at 460° C.

The glass-based article may include an amorphous substrate, a crystalline substrate or a combination thereof (e.g., a glass-ceramic substrate). In one or more embodiments, the glass-based article substrate (prior to being chemically strengthened as described herein) may include a glass composition, in mole percent (mole %), including:
$SiO_2$ in the range from about 40 to about 80, $Al_2O_3$ in the range from about 10 to about 30, $B_2O_3$ in the range from about 0 to about 10, $R_2O$ in the range from about 0 to about 20, and RO in the range from about 0 to about 15. As used herein, $R_2O$ refers to the total amount of alkali metal oxides such as $Li_2O$, $Na_2O$, $K_2O$, $Rb_2O$, and $Cs_2O$. As used herein RO refers to the total amount of alkaline earth metal oxides such as MgO, CaO, SrO, BaO, ZnO and the like. In some instances, the composition may include either one or both of $ZrO_2$ in the range from about 0 mol % to about 5 mol % and $P_2O_5$ in the range from about 0 to about 15 mol %. $TiO_2$ can be present from about 0 mol % to about 2 mol %.

In some embodiments, the glass composition may include $SiO_2$ in an amount, in mol %, in the range from about 45 to about 80, from about 45 to about 75, from about 45 to about 70, from about 45 to about 65, from about 45 to about 60, from about 45 to about 65, from about 45 to about 65, from about 50 to about 70, from about 55 to about 70, from about 60 to about 70, from about 70 to about 75, from about 70 to about 72, from about 50 to about 65, or from about 60 to about 65.

In some embodiments, the glass composition may include $Al_2O_3$ in an amount, in mol %, in the range from about 5 to about 28, from about 5 to about 26, from about 5 to about 25, from about 5 to about 24, from about 5 to about 22, from about 5 to about 20, from about 6 to about 30, from about 8 to about 30, from about 10 to about 30, from about 12 to about 30, from about 14 to about 30, 15 to about 30, or from about 12 to about 18.

In one or more embodiments, the glass composition may include $B_2O_3$ in an amount, in mol %, in the range from about 0 to about 8, from about 0 to about 6, from about 0 to about 4, from about 0.1 to about 10, from about 0.1 to about 8, from about 0.1 to about 6, from about 0.1 to about 4, from about 1 to about 10, from about 2 to about 10, from about 4 to about 10, from about 2 to about 8, from about 0.1 to about 5, or from about 1 to about 3. In some instances, the glass composition may be substantially free or free of $B_2O_3$. As used herein, the phrases "substantially free" or "free" with respect to the components of the composition means that the component is not actively or intentionally added to the composition during initial batching, but may be present as an impurity in an amount less than about 0.001 mol %.

In some embodiments, the glass composition may include one or more alkaline earth metal oxides, such as MgO, CaO and ZnO. In some embodiments, the total amount of the one or more alkaline earth metal oxides may be a non-zero amount up to about 15 mol %. In one or more specific embodiments, the total amount of any of the alkaline earth metal oxides may be a non-zero amount up to about 14 mol %, up to about 12 mol %, up to about 10 mol %, up to about 8 mol %, up to about 6 mol %, up to about 4 mol %, up to about 2 mol %, or up about 1.5 mol %. In some embodiments, the total amount, in mol %, of the one or more alkaline earth metal oxides may be in the range from about 0.01 to 10, from about 0.01 to 8, from about 0.01 to 6, from about 0.01 to 5, from about 0.05 to 10, from about 0.05 to 2, or from about 0.05 to 1. The amount of MgO may be in the range from about 0 mol % to about 5 mol % (e.g., from about 0.001 to about 1, from about 0.01 to about 2, or from about 2 mol % to about 4 mol %). The amount of ZnO may be in the range from about 0 to about 2 mol % (e.g., from about 1 mol % to about 2 mol %). The amount of CaO may be from about 0 mol % to about 2 mol %. In one or more embodiments, the glass composition may include MgO and may be substantially free or free of CaO and ZnO. In one variant, the glass composition may include any one of CaO or ZnO and may be substantially free or free of the others of MgO, CaO and ZnO. In one or more specific embodiments, the glass composition may include only two of the alkaline earth metal oxides of MgO, CaO and ZnO and may be substantially free or free of the third of the earth metal oxides.

The total amount, in mol %, of alkali metal oxides $R_2O$ in the glass composition may be in the range from about 5 to about 20, from about 5 to about 18, from about 5 to about 16, from about 5 to about 15, from about 5 to about 14, from about 5 to about 12, from about 5 to about 10, from about 5 to about 8, from about 5 to about 20, from about 6 to about 20, from about 7 to about 20, from about 8 to about 20, from about 9 to about 20, from about 10 to about 20, from about 11 to about 20, from about 12 to about 18, or from about 14 to about 18.

In one or more embodiments, the glass composition includes $Na_2O$ in an amount in the range from about 0 mol % to about 18 mol %, from about 0 mol % to about 16 mol % or from about 0 mol % to about 14 mol %, from about 0 mol % to about 12 mol %, from about 2 mol % to about 18 mol %, from about 4 mol % to about 18 mol %, from about 6 mol % to about 18 mol %, from about 8 mol % to about 18 mol %, from about 8 mol % to about 14 mol %, from about 8 mol % to about 12 mol %, or from about 10 mol % to about 12 mol %. In some embodiments, the composition may include at least about 4 mol % $Na_2O$.

In some embodiments, the amount of $Li_2O$ and $Na_2O$ is controlled to a specific amount or ratio to balance formability and ion exchangeability. For example, as the amount of $Li_2O$ increases, the liquidus viscosity may be reduced, thus preventing some forming methods from being used; however, such glass compositions are ion exchanged to deeper DOC levels, as described herein. The amount of $Na_2O$ can modify liquidus viscosity but can inhibit ion exchange to deeper DOC levels.

In one or more embodiments, the glass composition may include $K_2O$ in an amount less than about 5 mol %, less than about 4 mol %, less than about 3 mol %, less than about 2 mol %, or less than about 1 mol %. In one or more alternative embodiments, the glass composition may be substantially free or free, as defined herein, of $K_2O$.

In one or more embodiments, the glass composition may include $Li_2O$ in an amount about 0 mol % to about 18 mol %, from about 0 mol % to about 15 mol % or from about 0 mol % to about 10 mol %, from about 0 mol % to about 8 mol %, from about 0 mol % to about 6 mol %, from about 0 mol % to about 4 mol % or from about 0 mol % to about 2 mol %. In some embodiments, the glass composition may include $Li_2O$ in an amount about 1 mol % to about 20 mol %, 2 mol % to about 10 mol %, from about 4 mol % to about 10 mol %, from about 6 mol % to about 10 mol, or from about 5 mol % to about 8 mol %.

In one or more embodiments, the glass composition may include $Fe_2O_3$. In such embodiments, $Fe_2O_3$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free or free, as defined herein, of $Fe_2O_3$.

In one or more embodiments, the glass composition may include $ZrO_2$. In such embodiments, $ZrO_2$ may be present in an amount less than about 1 mol %, less than about 0.9 mol %, less than about 0.8 mol %, less than about 0.7 mol %, less than about 0.6 mol %, less than about 0.5 mol %, less than about 0.4 mol %, less than about 0.3 mol %, less than about 0.2 mol %, less than about 0.1 mol % and all ranges and sub-ranges therebetween. In one or more alternative embodiments, the glass composition may be substantially free or free, as defined herein, of $ZrO_2$.

In one or more embodiments, the glass composition may include $P_2O_5$ in a range from about 0 mol % to about 10 mol %, from about 0 mol % to about 8 mol %, from about 0 mol % to about 6 mol %, from about 0 mol % to about 4 mol %, from about 0.1 mol % to about 10 mol %, from about 0.1 mol % to about 8 mol %, from about 2 mol % to about 8 mol %, from about 2 mol % to about 6 mol % or from about 2 mol % to about 4 mol %. In some instances, the glass composition may be substantially free or free, as defined herein, of $P_2O_5$.

In one or more embodiments, the glass composition may include $TiO_2$. In such embodiments, $TiO_2$ may be present in an amount less than about 6 mol %, less than about 4 mol %, less than about 2 mol %, or less than about 1 mol %. In one or more alternative embodiments, the glass composition may be substantially free or free, as defined herein, of $TiO_2$. In some embodiments, $TiO_2$ is present in an amount in the range from about 0.1 mol % to about 6 mol %, or from about 0.1 mol % to about 4 mol %.

In some embodiments, the glass composition may include various compositional relationships. For example, the glass composition may include a ratio of the amount of $Li_2O$ (in mol %) to the total amount of $R_2O$ (in mol %) in the range from about 0 to about 1, from about 0 to about 0.5, from about 0 to about 0.4, from about 0.1 to about 0.5, or from about 0.2 to about 0.4.

In some embodiments, the glass composition may include a difference between the total amount of $R_2O$ (in mol %) to the amount of $Al_2O_3$ (in mol %) ($R_2O-Al_2O_3$) in the range from about 0 to about 5 (e.g., from about 0 to about 4, from about 0 to about 3, from about 0.1 to about 4, from about 0.1 to about 3, from about 0.1 to about 2 or from about 1 to about 2).

In some embodiments, the glass composition may include a difference between the total amount of $R_xO$ (in mol %) to the amount of $Al_2O_3$ (in mol %) ($R_xO-Al_2O_3$) in the range from about 0 to about 5 (e.g., from about 0 to about 4, from about 0 to about 3, from about 0.1 to about 4, from about 0.1 to about 3, from about 1 to about 3, or from about 2 to about 3). As used herein, RxO includes $R_2O$ and RO, as defined herein.

In some embodiments, the glass composition may include a ratio of the total amount of $R_2O$ (in mol %) to the amount of $Al_2O_3$ (in mol %) ($R_2O/Al_2O_3$) in the range from about 0 to about 5 (e.g., from about 0 to about 4, from about 0 to about 3, from about 1 to about 4, from about 1 to about 3, or from about 1 to about 2).

In one or more embodiments, the glass composition includes a combined amount of $Al_2O_3$ and $Na_2O$ greater than about 15 mol % (e.g., greater than 18 mol %, greater than about 20 mol %, or greater than about 23 mol %). The combined amount of $Al_2O_3$ and $Na_2O$ may be up to and including about 30 mol %, about 32 mol % or about 35 mol %.

The glass composition of one or more embodiments may exhibit a ratio of the amount of MgO (in mol %) to the total amount of RO (in mol %) in the range from about 0 to about 2.

In some embodiments, glass composition may be substantially free or free of nucleating agents. Examples of typical nucleating agents are $TiO_2$, $ZrO_2$ and the like. Nucleating agents may be described in terms of function in that nucleating agents are constituents in the glass can initiate the formation of crystallites in the glass.

In some embodiments, the compositions used for the glass substrate may be batched with from about 0 mol % to about 2 mol % of at least one fining agent selected from a group that includes $Na_2SO_4$, NaCl, NaF, NaBr, $K_2SO_4$, KCl, KF, KBr, and $SnO_2$. The glass composition according to one or more embodiments may further include $SnO_2$ in the range from about 0 to about 2, from about 0 to about 1, from about 0.1 to about 2, from about 0.1 to about 1, or from about 1 to about 2. The glass compositions disclosed herein may be substantially free or free of $As_2O_3$ and/or $Sb_2O_3$.

In one or more embodiments, the composition may specifically include from about 62 mol % to 75 mol % $SiO_2$; from about 10.5 mol % to about 17 mol % $Al_2O_3$; from about 5 mol % to about 13 mol % $Li_2O$; from about 0 mol % to about 4 mol % ZnO; from about 0 mol % to about 8 mol % MgO; from about 2 mol % to about 5 mol % $TiO_2$; from about 0 mol % to about 4 mol % $B_2O_3$; from about 0 mol % to about 5 mol % $Na_2O$; from about 0 mol % to about 4 mol % $K_2O$; from about 0 mol % to about 2 mol % $ZrO_2$; from about 0 mol % to about 7 mol % $P_2O_5$; from about 0 mol % to about 0.3 mol % $Fe_2O_3$; from about 0 mol % to about 2 mol % MnOx; and from about 0.05 mol % to about 0.2 mol % $SnO_2$.

In one or more embodiments, the composition may include from about 67 mol % to about 74 mol % $SiO_2$; from about 11 mol % to about 15 mol % $Al_2O_3$; from about 5.5 mol % to about 9 mol % $Li_2O$; from about 0.5 mol % to about 2 mol % ZnO; from about 2 mol % to about 4.5 mol % MgO; from about 3 mol % to about 4.5 mol % $TiO_2$; from about 0 mol % to about 2.2 mol % $B_2O_3$; from about 0 mol % to about 1 mol % $Na_2O$; from about 0 mol % to about 1 mol % $K_2O$; from about 0 mol % to about 1 mol % $ZrO_2$; from about 0 mol % to about 4 mol % $P_2O_5$; from about 0 mol % to about 0.1 mol % $Fe_2O_3$; from about 0 mol % to about 1.5 mol % MnOx; and from about 0.08 mol % to about 0.16 mol % $SnO_2$.

In one or more embodiments, the composition may include from about 70 mol % to 75 mol % $SiO_2$; from about 10 mol % to about 15 mol % $Al_2O_3$; from about 5 mol % to about 13 mol % $Li_2O$; from about 0 mol % to about 4 mol % ZnO; from about 0.1 mol % to about 8 mol % MgO; from about 0 mol % to about 5 mol % $TiO_2$; from about 0.1 mol % to about 4 mol % $B_2O_3$; from about 0.1 mol % to about 5 mol % $Na_2O$; from about 0 mol % to about 4 mol % $K_2O$; from about 0 mol % to about 2 mol % $ZrO_2$; from about 0 mol % to about 7 mol % $P_2O_5$; from about 0 mol % to about 0.3 mol % $Fe_2O_3$; from about 0 mol % to about 2 mol % MnOx; and from about 0.05 mol % to about 0.2 mol % $SnO_2$.

In one or more embodiments, the composition may include from about 52 mol % to about 65 mol % $SiO_2$; from about 14 mol % to about 18 mol % $Al_2O_3$; from about 5.5 mol % to about 7 mol % $Li_2O$; from about 1 mol % to about 2 mol % ZnO; from about 0.01 mol % to about 2 mol % MgO; from about 4 mol % to about 12 mol % $Na_2O$; from about 0.1 mol % to about 4 mol % $P_2O_5$; and from about 0.01 mol % to about 0.16 mol % $SnO_2$. In some embodiments, the composition may be substantially free or free of any one or more of $B_2O_3$, $TiO_2$, $K_2O$ and $ZrO_2$.

In one or more embodiments, the composition may include at least 0.5 mol % $P_2O_5$, $Na_2O$ and, optionally, $Li_2O$, where $Li_2O$(mol %)/$Na_2O$(mol %)<1. In addition, these compositions may be substantially free or free of $B_2O_3$ and $K_2O$. In some embodiments, the composition may include ZnO, MgO, and $SnO_2$.

In some embodiments, the composition may comprise: from about 58 mol % to about 65 mol % $SiO_2$; from about 11 mol % to about 19 mol % $Al_2O_3$; from about 0.5 mol % to about 3 mol % $P_2O_5$; from about 6 mol % to about 18 mol % $Na_2O$; from 0 mol % to about 6 mol % MgO; and from 0 mol % to about 6 mol % ZnO. In certain embodiments, the composition may comprise from about 63 mol % to about 65 mol % $SiO_2$; from 11 mol % to about 17 mol % $Al_2O_3$; from about 1 mol % to about 3 mol % $P_2O_5$; from about 9 mol % to about 20 mol % $Na_2O$; from 0 mol % to about 6 mol % MgO; and from 0 mol % to about 6 mol % ZnO.

In some embodiments, the composition may include the following compositional relationships $R_2O$(mol %)/$Al_2O_3$ (mol %)<2, where $R_2O=Li_2O+Na_2O$. In some embodiments, 65 mol %<$SiO_2$(mol %)+$P_2O_5$(mol %)<67 mol %. In certain embodiments, $R_2O$(mol %)+R'O(mol %)-$Al_2O_3$ (mol %)+$P_2O_5$(mol %)>-3 mol %, where $R_2O=Li_2O+Na_2O$ and R'O is the total amount of divalent metal oxides present in the composition.

In one or more specific embodiments, the glass-based articles can have a nominal composition before exchange about 63.60 mol % $SiO_2$, 15.67 mol % $Al_2O_3$, 6.24 mol % $Li_2O$, 10.81 mol % $Na_2O$, 1.16 mol % ZnO, 2.48 mol % $P_2O_5$, and 0.04 mol % $SnO_2$.

Where the glass-based article includes a glass-ceramic, the crystal phases may include β-spodumene, rutile, gahnite or other known crystal phases and combinations thereof.

The glass-based article may be substantially planar, although other embodiments may utilize a curved or otherwise shaped or sculpted substrate. In some instances, the glass-based article may have a 3D or 2.5D shape. The glass-based article may be substantially optically clear, transparent and free from light scattering. The glass-based article may have a refractive index in the range from about 1.45 to about 1.55. As used herein, the refractive index values are with respect to a wavelength of 550 nm.

Additionally or alternatively, the thickness of the glass-based article may be constant along one or more dimension or may vary along one or more of its dimensions for aesthetic and/or functional reasons. For example, the edges of the glass-based article may be thicker as compared to more central regions of the glass-based article. The length, width and thickness dimensions of the glass-based article may also vary according to the article application or use.

The glass-based article may be characterized by the manner in which it is formed. For instance, where the glass-based article may be characterized as float-formable (i.e., formed by a float process), down-drawable and, in particular, fusion-formable or slot-drawable (i.e., formed by a down draw process such as a fusion draw process or a slot draw process).

A float-formable glass-based article may be characterized by smooth surfaces and uniform thickness is made by floating molten glass on a bed of molten metal, typically tin. In an example process, molten glass that is fed onto the surface of the molten tin bed forms a floating glass ribbon. As the glass ribbon flows along the tin bath, the temperature is gradually decreased until the glass ribbon solidifies into a solid glass-based article that can be lifted from the tin onto rollers. Once off the bath, the glass glass-based article can be cooled further and annealed to reduce internal stress. Where the glass-based article is a glass ceramic, the glass-based article formed from the float process may be subjected to a ceramming process by which one or more crystalline phases are generated.

Down-draw processes produce glass-based articles having a uniform thickness that possess relatively pristine surfaces. Because the average flexural strength of the glass-based article is controlled by the amount and size of surface flaws, a pristine surface that has had minimal contact has a higher initial strength. When this high strength glass-based article is then further strengthened (e.g., chemically), the resultant strength can be higher than that of a glass-based article with a surface that has been lapped and polished. Down-drawn glass-based articles may be drawn to a thickness of less than about 2 mm. In addition, down drawn glass-based articles have a very flat, smooth surface that can be used in its final application without costly grinding and polishing. Where the glass-based article is a glass ceramic, the glass-based article formed from the down draw process may be subjected to a ceramming process by which one or more crystalline phases are generated.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank as two flowing glass films. These outside surfaces of the drawing tank extend down and inwardly so that they join at an edge below the drawing tank. The two flowing glass films join at this edge to fuse and form a single flowing glass-based article. The fusion draw method offers the advantage that, because the two glass films flowing over the channel fuse together, neither of the outside surfaces of the resulting glass-based article comes in contact with any part of the apparatus. Thus, the surface properties of the fusion drawn glass-based article are not affected by such contact. Where the glass-based article is a glass ceramic, the glass-based article formed from the fusion process may be subjected to a ceramming process by which one or more crystalline phases are generated.

The slot draw process is distinct from the fusion draw method. In slow draw processes, the molten raw material glass is provided to a drawing tank. The bottom of the drawing tank has an open slot with a nozzle that extends the length of the slot. The molten glass flows through the slot/nozzle and is drawn downward as a continuous glass-based article and into an annealing region.

The glass-based article may be acid polished or otherwise treated to remove or reduce the effect of surface flaws.

Figure 11:
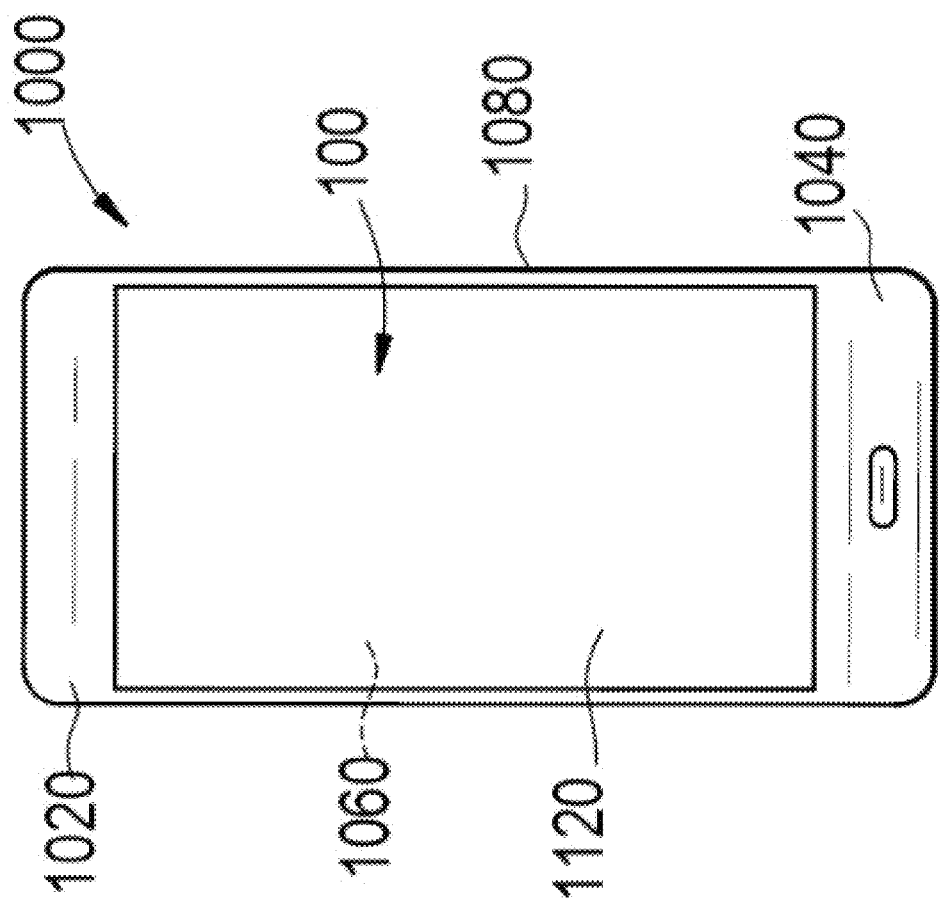
FIG. 11 is a front plan view of an electronic device incorporating one or more embodiments of the glass-based articles described herein.

Another aspect of this disclosure pertains to devices that include the glass-based articles described herein. For example, the devices may include any device including a display or requiring, strengthened thin glass. In one or more embodiments the devices are electronic devices, which can include mobile devices such as mobile phones, laptops, tablets, mp3 players, navigation devices and the like, or stationary devices such as computers, electronic displays, in vehicle information/entertainment systems, billboards, point of sale systems, navigation systems, and the like). In some embodiments, the glass-based articles described herein may be incorporated into architectural articles (walls, fixtures, panels, windows, etc.), transportation articles (e.g., glazing or interior surfaces in automotive applications, trains, aircraft, sea craft, etc.), appliances (e.g., washers, dryers, dishwashers, refrigerators and the like), or any article that requires some fracture resistance. As shown in FIG. 11, an electronic device 1000 may include a glass-based article 100 according to one or more embodiments described herein. The device 100 includes a housing 1020 having front 1040, back 1060, and side surfaces 1080; electrical components (not shown) that are at least partially inside or entirely within the housing and including at least a controller, a memory, and a display 1120 at or adjacent to the front surface of the housing. The glass-based article 100 is shown as a cover disposed at or over the front surface of the housing such that it is over the display 1120. In some embodiments, the glass-based article may be used as a back cover or portion of the housing.

Another aspect of this disclosure pertains to a method of forming a glass-based article. The method includes providing a glass-based substrate having a first surface and a second surface defining a thickness of about 3 millimeter or less (e.g., in the range from about 0.01 millimeter to about 3 millimeters, from about 0.1 millimeter to about 3 millimeters, from about 0.2 millimeter to about 3 millimeters, from about 0.3 millimeter to about 3 millimeters, from about 0.4 millimeter to about 3 millimeters, from about 0.01 millimeter to about 2.5 millimeters, from about 0.01 millimeter to about 2 millimeters, from about 0.01 millimeter to about 1.5 millimeters, from about 0.01 millimeter to about 1 millimeter, from about 0.01 millimeter to about 0.9 millimeter, from about 0.01 millimeter to about 0.8 millimeter, from about 0.01 millimeter to about 0.7 millimeter, from about 0.01 millimeter to about 0.6 millimeter, from about 0.01 millimeter to about 0.5 millimeter, from about 0.1 millimeter to about 0.5 millimeter, or from about 0.3 millimeter to about 0.5 millimeter.) and generating a stress profile in the glass-based substrate, as described herein to provide the fracture-resistant glass-based article. In one or more embodiments, generating the stress profile comprises ion exchanging a plurality of alkali ions into the glass-based substrate to form a non-zero alkali metal oxide concentration that varies along a substantial portion of the thickness (as described herein) or along the entire thickness. In one example, generating the stress profile includes immersing the glass-based substrate in a molten salt bath including nitrates of Na+, K+, Rb+, Cs+, Ag+(or Cu+) or a combination thereof, having a temperature of about 350° C. or greater (e.g., about 350° C. to about 500° C.). In one example, the molten bath may include $NaNO_3$, $KNO_3$ or a combination thereof, and may have a temperature of about 485° C. or less. In another example, the bath may include a mixture of $NaNO_3$ and $KNO_3$ and have a temperature of about 460° C. The glass-based substrate may be immersed in the bath for about 2 hours or more, up to about 48 hours (e.g., from about 2 hours to about 10 hours, from about 2 hours to about 8 hours, from about 2 hours to about 6 hours, from about 3 hours to about 10 hours, or from about 3.5 hours to about 10 hours).

In some embodiments, the method may include chemically strengthening or ion exchanging the glass-based substrate in a single bath or in more than one step using successive immersion steps in more than one bath. For example, two or more baths may be used successively. The composition of the one or more baths may include a single metal (e.g., Ag+, Na+, K+, Rb+, Cs+, Ag+ or Cu+) or a combination of metals in the same bath. When more than one bath is utilized, the baths may have the same or different composition and/or temperature as one another. The immersion times in each such bath may be the same or may vary to provide the desired stress profile.

In one or more embodiments of the method, a second bath or subsequent baths may be utilized to generate a greater surface CS. In some instances, the method includes immersing the glass-based substrate in the second or subsequent baths to generate a greater surface CS, without significantly influencing the chemical depth of layer and/or the DOC. In such embodiments, the second or subsequent bath may include a single metal (e.g., $KNO_3$ or $NaNO_3$) or a mixture of metals ($KNO_3$ and $NaNO_3$). The temperature of the second or subsequent bath may be tailored to generate the greater surface CS. In some embodiments, the immersion time of the glass-based substrate in the second or subsequent bath may also be tailored to generate a greater surface CS without influencing the chemical depth of layer and/or the DOC. For example, the immersion time in the second or subsequent baths may be less than 10 hours (e.g., about 8 hours or less, about 5 hours or less, about 4 hours or less, about 2 hours or less, about 1 hour or less, about 30 minutes or less, about 15 minutes or less, or about 10 minutes or less).

In one or more alternative embodiments, the method may include one or more heat treatment steps which may be used in combination with the ion-exchanging processes described herein. The heat treatment includes heat treating the glass-based article to obtain a desired stress profile. In some embodiments, heat treating includes annealing, tempering or heating the glass-based substrate to a temperature in the range from about 300° C. to about 600° C. The heat treatment may last for 1 minute up to about 18 hours. In some embodiments, the heat treatment may be used after one or more ion-exchanging processes, or between ion-exchanging processes.

Embodiments of the disclosure pertain to glass based articles and methods for their manufacture that provide significantly high stress at deep regions of the stress profile. In one or more embodiments, the diffusion of potassium (K) and sodium (Na) and silver (Ag) (or copper (Cu)) in a four ion interaction where K, Li, Na and Ag (or Cu) will interact near the surface to provide unique stress profiles and glass-based articles with improved drop resistance compared to articles that do not include ion exchange of Ag or Cu. Since potassium (K) is very slow and with lower diffusion coefficient it will be mostly present in the near surface, while silver (Ag) (or copper (Cu)) and sodium (Na) will be present in the surface and also in the glass interior with lithium (Li) permeating the whole glass at different levels. In addition to providing improved stress profiles and drop-induced fracture performance, according to one or more embodiments, glass-based articles also have antimicrobial properties.

The ionic radius of ions is such as K>Ag>Na>Li. Therefore silver (Ag) can induce compressive stress when exchanged by sodium (Na) and lithium (Li). However, when silver (Ag) exchanges with potassium (K), a tensile stress is created. In terms of diffusivity, typically potassium (K) is very slow in comparison to silver (Ag), sodium (Na) and lithium Thus, Li or K is slower in diffusivity than Ag, Na, and Li.

One possible issue with the addition of silver to a glass by ion-exchange is that it may change the color of the glass. This is due to enhanced absorption in the near UV to Blue wavelengths. However, the results below indicate that this change in color can be minimized and be basically imperceptible to the human eye.

In one or more embodiments, it has been shown that lithium-containing glasses ion-exchanged with silver allows the formation of additional level of stress at depth due to the fast Li, Na, and Ag ion-exchange. In specific embodiments, particularly good results were achieved where there is no potassium (K) in the base glass. In embodiments where there is some potassium (K) in the base glass, a four ion-exchange of K, Li, Na, and Ag will occur at depth, and the appearance of tension or compression will depend on the stoichiometry or molar content of each ion in position after the ion exchange process.

In one or more embodiments silver ions have a diffusion depth of at least 0.003·t, 0.004·t, 0.005·t, 0.01·t, 0.02·t, 0.03·t, 0.04·t, 0.05·t, 0.1·t, 0.5·t, or 1·t (across the whole thickness of the article). As used herein, "diffusion depth refers to an ion concentration of $e^{-1}$ of the ion concentration at the surface of the glass-based article.

In one or more embodiments, the glass-based articles described herein include a coating on the first surface and/or the second surface to protect the glass-based article from damage, such as sharp contact induced fracture and surface scratches. In one or more embodiments, one or more coatings may be applied for other functions such as for a capacitive touch sensor, or other optical qualities. Thus, embodiments of the disclosure pertain to glass-based articles having multiple layers of coatings on the glass-based article. In an embodiment, a multi-layer scratch resistant coating (e.g., an 8-layer scratch resistant coating) having a thickness of approximately 2 micrometers is provided, which can be the only coating or combined antireflective coatings, coatings for matching reflective index of the coating to the underlying glass-based substrate, and other functional coatings. In one or more embodiments, the scratch-resistant coating has Young's modulus value that is in a range of 100 GPa and 300 GPa. In one or more embodiments, the scratch resistant coating is selected from $Al_2O_3$, Mn, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$ and combinations thereof.

In one or more embodiments an easy-to-clean (ETC) coating is on the first surface and/or second surface of the glass based articles described herein. In one or more embodiments, ETC coating comprises a perfluoroalkyl silane of formula $(R_F)_y$—$SiX_{4-y}$, where y=1, 2 or 3, the $R_F$ group is a perfluoroalkyl group having a carbon chain length of 6-130 carbon atoms from the silicon atom to the end of the chain at its greatest length, and X is —Cl, acetoxy, —$OCH_3$ or $OCH_2H_3$. ETC coatings are applied to minimize and/or prevent stains and/or fingerprints on the glass-based articles.

The disclosure includes the following embodiments:

A first embodiment pertains to a glass-based article comprising a first surface and a second surface opposing the first surface defining a thickness (t); and a compressive stress (CS) layer containing ion-exchanged potassium and ion-exchanged silver or ion-exchanged potassium and ion-exchanged copper, the CS layer defining a stress profile and extending from the first surface to a depth of compress (DOC), wherein the DOC is in a range from 0.1·t to 0.3·t, the CS at the first surface in a range from 300 MPa to 1500 MPa and defining a compressive stress profile including a spike region, a tail region and a knee region between the spike region and the tail region, wherein all points of the stress profile in the spike region comprise a tangent having a value that is in a range from −200 MPa/micrometer to −15 MPa/micrometer and all points in the tail region comprise a tangent having a value that is in a range from −3 MPa/micrometer to −0.01 MPa/micrometer.

In a second embodiment, the first embodiment is such that the CS layer contains ion-exchanged silver, ion-exchanged potassium and ion-exchanged sodium. In a third embodiment, any of the first through second embodiments are such that the glass-based article contains $Li_2O$. In a fourth embodiment, any of the first through third embodiments are such that $Li_2O$ is present in the glass-based article in a range from 0.1 mol % to 20 mol %. In a fifth embodiment any of the first through fourth embodiments are such that $B_2O_3$ is present in the glass-based article in a range from 0.1 mol % to 10 mol %.

In a sixth embodiment any of the first through fifth embodiments are such that $P_2O_5$ is present in the glass-based article in a range from 0.1 mol % to 10 mol %. In a seventh embodiment, any of the first through sixth embodiments are such that the glass-based article is free of $K_2O$. In an eighth embodiment any of the first through seventh embodiments are such that the compressive stress (CS) at the first surface is in a range from 450 MPa to 1200 MPa. In a ninth embodiment, any of the first through eighth embodiments are such that the surface compressive stress (CS) is in a range from 600 MPa to 1200 MPa.

In a tenth embodiment any of the first through ninth embodiments are such that all points of the stress profile in the spike region comprise a tangent having a value that is in a range from −200 MPa/micrometer tp −45 MPa/micrometer and all points in the tail region comprise a tangent having a value that is in a range from −2 MPa/micrometer to −0.01 MPa/micrometer. In an eleventh embodiment, any of the first through tenth embodiments are such that all points of the stress profile in the spike region comprise a tangent having a value that is in a range from −200 MPa/micrometer to −75 MPa/micrometer and all points in the tail region comprise a tangent having a value that is in a range from −1 MPa/micrometer and −0.01 MPa/micrometer. In a twelfth embodiment any of the first through eleventh embodiments are such that there is a compressive stress in the tail region of greater than 80 MPa at 0.1·t.

In a thirteenth embodiment, any of the first through twelfth embodiments are such that wherein there is a compressive stress in the tail region of greater than 50 MPa at 0.1·t. In a fourteenth embodiment, any of the first through thirteenth embodiments are such that all points of the stress profile in the tail region form a power-law profile having a power exponent, wherein the power exponent is in a range from about 1.2 to 3.4.

In a fifteenth embodiment, any of the first through fourteenth embodiments are such that t is in a range from about 0.1 millimeters to 3 millimeters. In a sixteenth embodiment, any of the first through fifteenth embodiments are such that t is in a range from about 0.1 millimeters to 2 millimeters. In a seventeenth embodiment, any of the first through sixteenth embodiments are such that all points of the stress profile in the tail region form a power-law profile having a power exponent, wherein the power exponent is in a range from about 1.2 to 3.4. In an eighteenth embodiment, any of the first through seventeenth embodiments are such that the article further exhibits CIELAB color space coordinates, under a CIE illuminant F02, of L* values of about 90 and greater, a* values in a range from about −0.10 to about 0, and b* values in a range from about −0.10 to about 0.

In an nineteenth embodiment, any of the first through eighteenth embodiments are such that the article further exhibits an antimicrobial efficacy for E. coli of greater than 2 log kill. In a twentieth embodiment, any of the first through nineteenth embodiments are such that the article further comprises comprising a coating on the first surface. In a twenty-first embodiment, the twentieth embodiment is such that the coating comprises a scratch-resistant coating. In a twenty-second embodiment, the twentieth embodiment is such that the coating comprises an easy-to-clean coating.

A twenty third embodiment pertains to a compressive stress layer under a compressive stress CS, wherein the compressive stress layer comprises ion-exchanged silver or ion-exchanged copper, wherein the glass-based article has at least a 60% survival rate when subjected to an inverted ball drop test with a 4.2 g stainless steel ball having a diameter of 10 mm from a height of about 150 cm onto a 30 grit sandpaper positioned above a surface of the glass so there is a 100 μm air gap between the sandpaper and the surface of the glass, and wherein the survival rate is based on testing at least 5 samples.

A twenty fourth embodiment pertains to a device comprising a housing having front, back, and side surfaces; electrical components that are at least partially inside the housing; a display at or adjacent to the front surface of the housing; and a cover substrate disposed over the display, wherein at least a portion of the cover substrate or the housing comprises the glass-based article of any one of the first through twenty-third embodiments.

A twenty-fifth embodiment pertains to a method of making a glass-based article comprising ion-exchanging silver and potassium into a glass-based substrate comprising $Li_2O$ in a range from 0.1 mol % to 20 mol %, wherein the glass-based substrate comprises a first surface and a second surface opposing the first surface defining a thickness (t) and the ion-exchanging results in a compressive stress (CS) layer containing ion-exchanged potassium and ion-exchanged silver or ion-exchanged potassium and ion-exchanged copper, the CS layer extending from the first surface to a depth of compress (DOC), wherein the DOC is in a range from 0.1·t to 0.3·t, the CS at the first surface in a range from 300 MPa to 1500 MPa and defining a compressive stress profile including a spike region, a tail region and a knee region between the spike region and the tail region, wherein all points of the stress profile in the spike region comprise a tangent having a value that is in a range from −200 MPa/micrometer to −15 MPa/micrometer and all points in the tail region comprise a tangent having a value that is in a range from −3 MPa/micrometer to −0.01 MPa/micrometer. In a twenty-sixth embodiment, the twenty-fifth embodiment is such that the glass-based substrate is subjected to one, two or three ion-exchange processes. In a twenty seventh embodiment, the twenty fifth or twenty sixth embodiment is such that sodium is ion-exchanged into the glass-based substrate.

One or more embodiments of glass compositions described herein can be used to make glass-based articles as described herein, including Examples 1-3 below, as well as the ranges of compositions described herein.

EXAMPLES

Various embodiments will be further clarified by the following examples. In the Examples, prior to being strengthened, the Examples are referred to as "substrates". After being subjected to strengthening, the Examples are referred to as "articles" or "glass-based articles".

Examples 1-3 utilized glass substrates having a nominal composition of about 63.60 mol % $SiO_2$, 15.67 mol % $Al_2O_3$, 6.24 mol % $Li_2O$, 10.81 mol % $Na_2O$, 1.16 mol % ZnO, 2.48 mol % $P_2O_5$, and 0.04 mol % $SnO_2$. The glass substrates had a thickness of 0.8 mm.

Example 1

Figure 4:
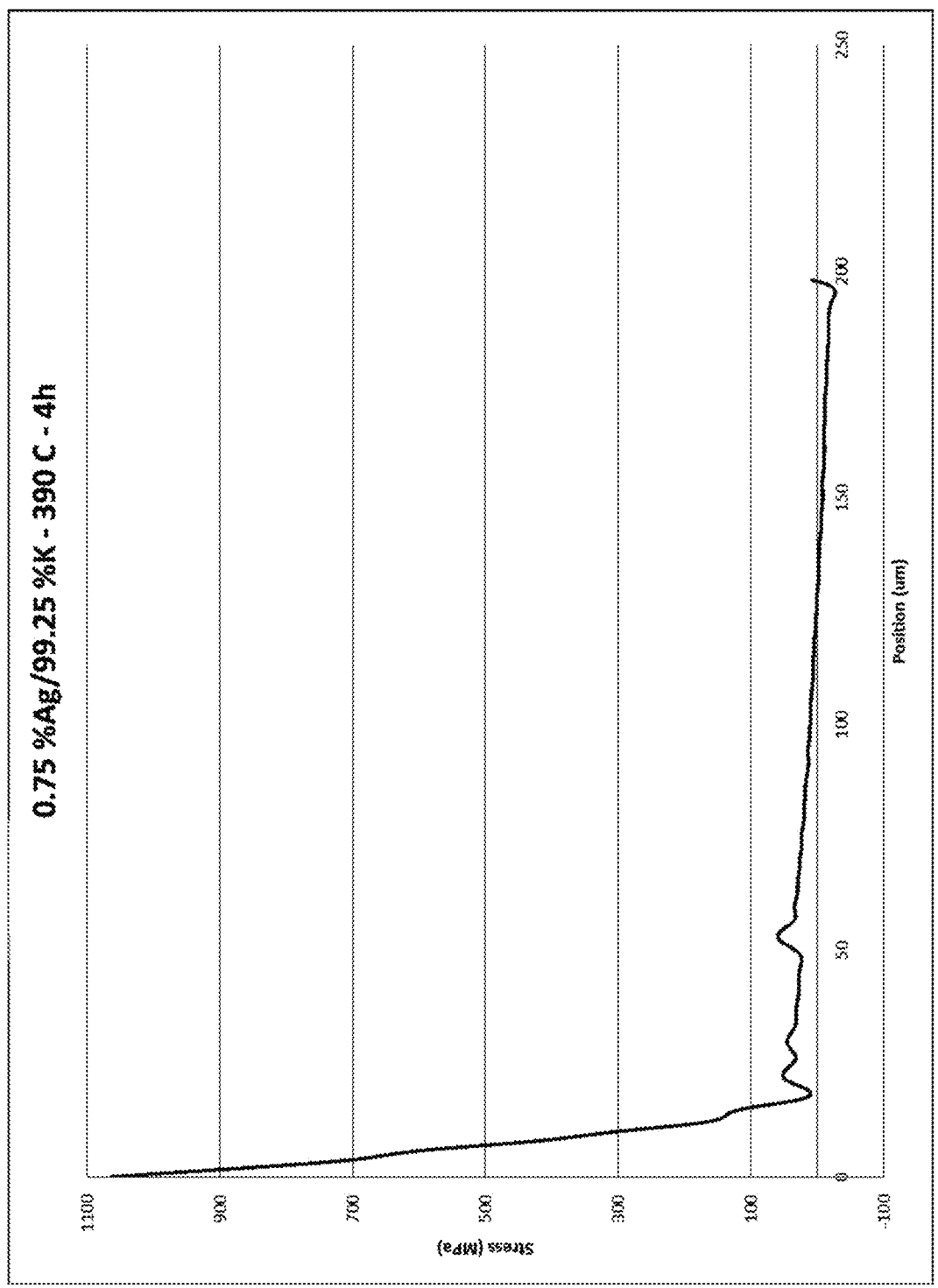
FIG. 4 is a cross-sectional view of stress profile across a thickness of a chemically strengthened glass-based article according to Example 1 and according to one or more embodiments of this disclosure.

A glass substrate was immersed in a bath containing about 99.25 wt % $KNO_3$ and 0.75 wt % $AgNO_3$ at a temperature of 390° C. for a duration of 4 hours. The resulting stress profile is shown in FIG. 4 and was measured using RNF as described above except that the compressive stress at the surface was measured using FSM as described above. The potassium exchanged very slowly creating a spike region that extended to approximately 14.5 micrometers deep with a very large stress at surface of about 1.1 GPa. The stress profile also included a long tail region of stress at depths from about 15 micrometers to about 140 micrometers. In spite of the low concentration of silver (Ag) of 0.75 wt % in the bath, this example demonstrates that a stress profile that includes a knee where both spike region and tail region converge around 50 MPa due to the silver (Ag) concentration at that point around 14.5 um. While not wishing to be bound by a particular theory, it is believed that the silver contributes to approximately 40-50 MPa or more in the immediate stress at surface (CS) due to the complex interaction between the four ions K, Na, Ag and Li.

Example 2

Figure 5:
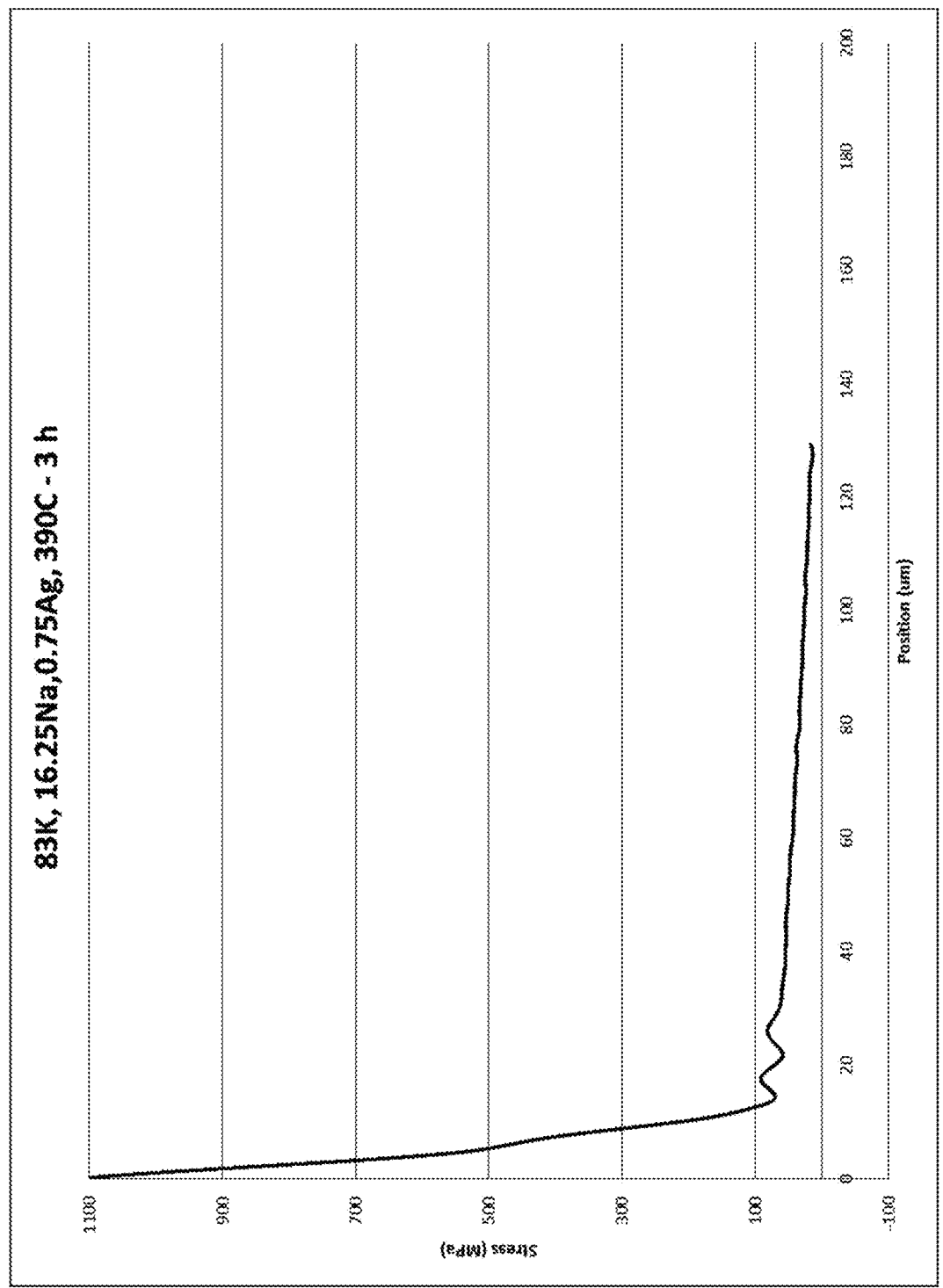
FIG. 5 is a cross-sectional view of stress profile across a thickness of a chemically strengthened glass-based article according to Example 2 and according to one or more embodiments of this disclosure.

A glass substrate was immersed in a bath containing about 83 wt % $KNO_3$, 16 wt % $NaNO_3$, and 0.75 wt % $AgNO_3$ at a temperature of 390° C. for a duration of 3 hours. The resulting stress profile is shown in FIG. 5 and was measured using RNF as described above except that the compressive stress at the surface was measured using FSM as described above. The potassium exchanged very slowly creating a spike region that extends to approximately 14.5 um depth with a very large stress at surface of about 1.1 GPa. The stress profile in FIG. 5 also shows a long tail region of stress at depth. The stress at depths from about 15 micrometers to 120 micrometers is higher than in Example 1 and FIG. 4. This is due to the fact that now both silver (Ag) and sodium (Na) are being exchanged at depth leading to a dual contribution of the intensity of the stress at depth. In spite of the low concentration of silver (Ag) of 0.75 wt % in the bath, it believed that the silver contribution to the stress in this case is around 50 MPa at that point around 14.5 um. While not wishing to be bound by a particular theory, it is believed that the silver contributes to approximately 40-50 MPa or more in the immediate stress at surface (CS) due to the complex interaction between the four ions K, Na, Ag and Li in the glass substrate.

Example 3

Figure 6:
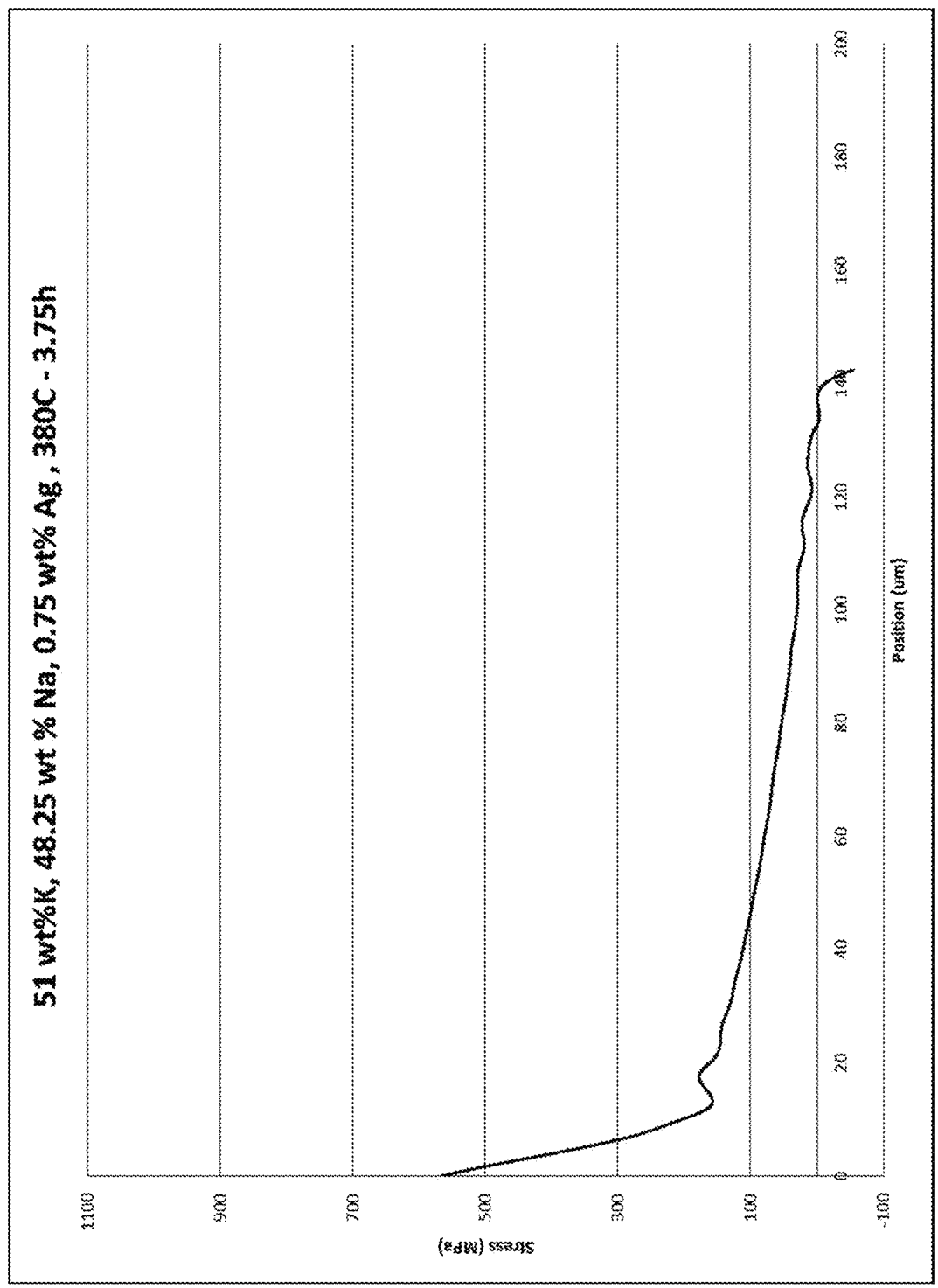
FIG. 6 is a cross-sectional view of stress profile across a thickness of a chemically strengthened glass-based article Example 3 and according to according to one or more embodiments of this disclosure.

A glass substrate was immersed in a bath containing about 51 wt % $KNO_3$, 48.25 wt % $NaNO_3$, and 0.75 wt % $AgNO_3$ at a temperature of 380° C. for a duration of 3.75 hours. The resultant stress profile is shown in FIG. 6 and was measured using RNF as described above except that the compressive stress at the surface was measured using FSM as described above. The potassium exchanged very slowly creating a spike region that extends from the surface to approximately 12 micrometers deep with a very large stress at the surface of about 550 MPa. There is also a long tail region of stress extending from about 12 micrometers to a depth of about 140 micrometers. The stress at in the tail region is higher than in Example 1 and FIG. 3 due to the fact that both silver (Ag) and sodium (Na) are being exchanged at depth leading to a dual contribution of the intensity of the stress at depth. Despite the low concentration of silver (Ag) of 0.75 wt % in the bath, the total stress in this case is around 180 MPa at a depth of about 12 micrometers. While not wishing to be bound by a particular theory, it is believed that the silver contributes to approximately 40-50 MPa or more in the immediate stress at surface (CS) due to the complex interaction between the four ions K, Na, Ag and Li.

Using a FSM-6000 instrument, the image of coupled modes to the surface waveguide as measured by a prism coupler method can be observed to see the silver impact on the resultant stress at depth due to the presence now of a positive change of index of refraction beyond the region where the potassium is diffused. This allows for the visualization of all the fringes (guided modes) and a more comprehensive analysis and measurement of the stress profile at depth from these fringes.

Example 4

Example 4 utilized a glass substrate having a nominal composition of about 63.60 mol % $SiO_2$, 15.67 mol %

Figure 12:
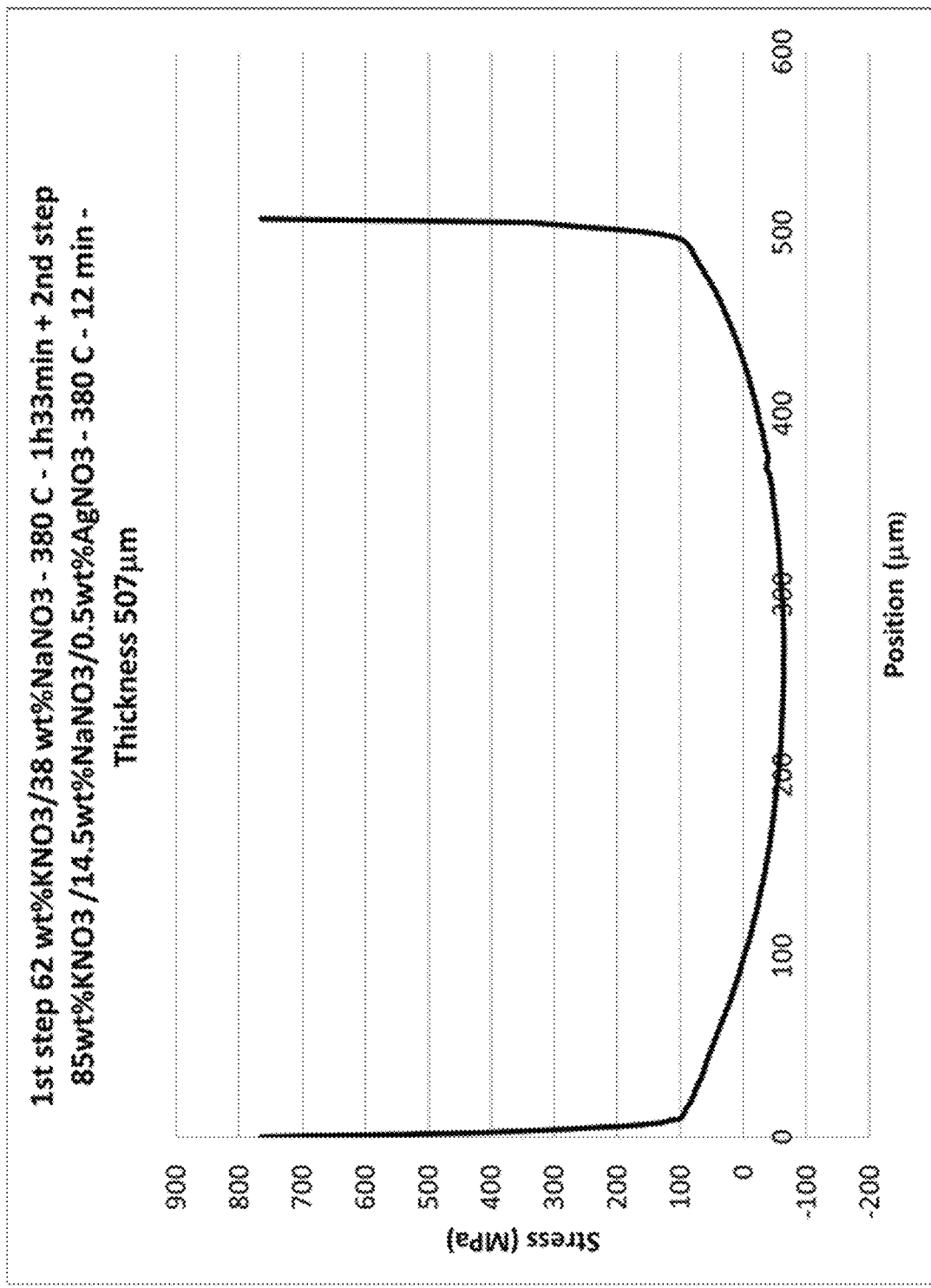
FIG. 12 is a is a cross-sectional view of stress profile across a thickness of a chemically strengthened glass-based article according to Example 4 and according to one or more embodiments of this disclosure.

$Al_2O_3$, 6.24 mol % $Li_2O$, 10.81 mol % Na2O, 1.16 mol % ZnO, 2.48 mol % $P_2O_5$, and 0.04 mol % $SnO_2$ The glass substrate had a thickness of 0.507 mm. The glass substrate was immersed in a first bath containing about 62 wt % KNO3 and 38 wt % NaNO3 at a temperature of 380° C. for a duration of 1 hour and 33 minutes. Then the glass substrate was immersed in a second bath containing about 85 wt % $KNO_3$, 14.5 wt % $NaNO_3$ and 0.5 wt % $AgNO_3$ at a temperature of 380° C. for a duration of 12 minutes. The resulting stress profile is shown in FIG. 12 and was measured using RNF as described above except that the compressive stress at the surface was measured using FSM as described above. A spike region, knee, and tail region are shown. The double ion exchange (DIOX) performed in this example minimizes the use of expensive silver compared to the single ion exchanges performed in Examples 1-3.

Example 5

Samples from Examples 1, 2 and 3 were measured for transmission and analyzed with A, D65 and F02 illuminants. The same procedure was repeated and measured after diffusion into glass substrates in bath containing about 99.25 wt % $KNO_3$ and 0.75 wt % $KNO_3$ at 390° C. for durations of 0.5 hour, 1.0 hour, 2.0 hour and 4.0 hour. CIELAB color space coordinates (e.g., CIE $L^*$; CIE $a^*$; and CIE $b^*$; or CIE $L^*$, $a^*$, and $b^*$; or $L^*$, $a^*$, and $b^*$) were determined by methods known to those in the art from total reflectance-specular included—measurements, such as, those described by F. W. Billmeyer, Jr., "Current American Practice in Color Measurement," Applied Optics, Vol. 8, No. 4, pp. 737-750 (April 1969), which are incorporated by reference herein, at http://www.xphotonics.com/tech/Color%20Measurement/ Current%20American%20Practice%20in%20Color%20- Measurement.pdf.

Equipment and supplies for making such total reflectance—specular included—measurements and translating results to obtain $L^*$; $a^*$; and $b^*$ color space coordinates included:

an ultraviolet-visible-near infrared (UV-VIS-NIR) spectrophotometer equipped with integrating sphere such as the commercially available Varian Cary 5G or PerkinElmer Lambda 950 UV-VIS-NIR spectrophotometers (see e.g., LAMBDA™ UV/Vis/NIR and UV/Vis spectrophotometers—950, 850, and 650; Applications and Use of Integrating Spheres; and High Performance Lambda Spectroscopy Accessories brochures, which are incorporated by reference herein, at
http://www.perkinelmer.com.cn/CMSResources/Images/46- 131732BRO_Lambda950850650Americas.pdf;
http://www.perkinelmer.com/CMSResources/Images/4474- 191APP_LAMBDA650IntegratingSpheres.pdf; and
http://www.labsphere.com/uploads/LambdaSpectroscopy-Brochure.pdf, respectively)
appropriately equipped and configured so as to be enabled for total reflectance—specular included—measurements in the wavelength range 250-3300 nm (e.g., ultraviolet (UV: 300-400 nm), visible (Vis: 400-700 nm), and infrared (IR: 700-2500 nm); and an analytical software (UV/VIS/NIR application pack of the GRAMS spectroscopy software suite commercially available from Thermo Scientific West Palm Beach, Fla., US; see e.g., GRAMS-UG1009 brochure, which is incorporated by reference herein, at https://www.thermo.com/ eThermo/CMA/PDFs/Product/productPDF_24179.pdf) for color measurements coupled to a UV-VIS-NIR spectrophotometer that translated measurement results to the CIELAB color space coordinates ($L^*$; $a^*$; and $b^*$) based on F02 illuminant and a 10-degree standard observer.

Comparison of the $a^*$ and $b^*$ parameters for the various samples that were not ion-exchanged, ion-exchanged for 0.5 hours, 1 hour, 2 hours and 4 hours showed that the $a^*$ and $b^*$ parameters changed very little for each of the A, D65 and F02 illuminants. The maximum change was about 0.08. The total delta-E changed by a maximum 0.12. The measurements indicate that the change in color due to ion exchange of silver is very small. The $L^*$ values for all samples exceeded 90, 91, 92, 93, 94, 95, 95.5, 96 and 96.5. The $a^*$ values for all samples were in a range of −0.10 and 0.05, and the $b^*$ values for all samples were in a range of 0.15 and 0.35. The samples exhibited CIELAB color space coordinates, under a CIE illuminant F02, of $L^*$ values of about 90 and greater, $a^*$ values in a range from about −0.10 to about 0, and $b^*$ values in a range from about −0.10 to about 0.

COMPARATIVE EXAMPLES

Comparative Examples 1 and 2 utilized glass substrates having a nominal composition of about 57.43 mol % $SiO_2$, 16.12 mol % $Al_2O_3$, 17.05 mol % $Na_2O$, 2.81 mol % MgO, 6.54 mol % $P_2O_5$, 0.003 mol % $TiO_2$, and 0.07 mol % $SnO_2$. The glass substrates had a thickness of 0.8 mm.

Comparative Example 1

A glass substrate was immersed in a bath containing about 62 wt % $KNO_3$, 38 wt % $NaNO_3$ at a temperature of 450° C. for a duration of 7.25 hours, and then immersed in a bath containing 100 wt % $KNO_3$ at a temperature of 390° C. for a duration of 12 minutes. This comparative example is labeled Comp. 1 in the Figures.

Comparative Example 2

A glass substrate was immersed in a bath containing about 51 wt % $KNO_3$, 49 wt % $NaNO_3$ at a temperature of 460° C. for a duration of 14 hours, and then immersed in a bath containing 100 wt % $KNO_3$ at a temperature of 390° C. for a duration of 15 minutes. This comparative example is labeled Comp. 2 in the Figures.

Comparative Example 3

Comparative Example 3 utilized the same glass substrates as in Examples 1 and 2, namely, glass substrates having a nominal composition of about 63.60 mol % $SiO_2$, 15.67 mol % $Al_2O_3$, 6.24 mol % $Li_2O$, 10.81 mol % $Na_2O$, 1.16 mol % ZnO, 2.48 mol % $P_2O_5$, and 0.04 mol % $SnO_2$. The glass substrates had a thickness of 0.8 mm. The glass substrate was immersed in a bath containing about 51 wt % $KNO_3$, 49 wt % $NaNO_3$ at a temperature of 380° C. for a duration of 3.75 hours. This comparative example is labeled Comp. 3 in the Figures.

Example 6—Drop Testing

The IBOS test described above was utilized on substrates made in accordance with Comparative Examples 1-3 and Example 3. The IBOS test was as described above and used a 4.2 gram stainless steel ball having diameter of 10 mm. FIG. 7 shows the results. As shown in FIG. 7, drop tests performed with consecutive drops increasing in height from 10 cm to 220 cm with 10 cm increments using sandpaper with 80 grit roughness. A significant increase in the average drop height to failure for Example 3 is shown in FIG. 7 due to the increased stresses induced by the small amount of silver introduced. The drop height was about 37% than Comparative Example 3, which did not contain silver. And the samples from Example 3 had approximately a 80% survival rate at 150 cm.

Example 7—Antimicrobial Measurements

The test method used for determining antibacterial properties of a glass substrate was the JISZ-2801: 2000 method, which is a Japanese Industrial Standard that was developed to measure the antibacterial activity of glass containing antimicrobial metal such as copper or silver. The antibacterial activity is measured quantitatively by determining the survival of bacteria cells that have been held in intimate contact with a surface thought to be antibacterial and incubated for 24 hours at 35° C. After the time period has elapsed the cells are counted and compared to a non-treated surface. A surrogate test was also utilized to determine silver leaching after application of an easy-to-clean coating by spray-coating. A substrate made in accordance with Example 3 was tested and showed a log kill of about 6.03 for *E. coli* (greater than 99.9999% bacterial reduction), which exceeded the standard for antimicrobial efficacy of greater than 2 log kill. The surrogate test showed a concentration leachate of about 95 ppb.

It will be apparent to those skilled in the art that various modifications and variations can be made without departing from the spirit or scope of the disclosure.

What is claimed is:

1. A glass-based article comprising:
a first surface and a second surface opposing the first surface defining a thickness (t); and
a compressive stress (CS) layer containing (i) ion-exchanged potassium and ion-exchanged silver or (ii) ion-exchanged potassium and ion-exchanged copper, the CS layer defining a stress profile and extending from the first surface to a depth of compress (DOC), wherein the DOC is in a range from 0.1·t to 0.3·t, the CS at the first surface in a range from 300 MPa to 1500 MPa and defining a compressive stress profile including a spike region, a tail region and a knee region between the spike region and the tail region, wherein all points of the stress profile in the spike region comprise a tangent having a value that is in a range from −200 MPa/micrometer to −15 MPa/micrometer and all points in the tail region comprise a tangent having a value that is in a range from −3 MPa/micrometer to −0.01 MPa/micrometer, wherein there is a compressive stress in the tail region of greater than 50 MPa at 0.1·t.

2. The glass-based article of claim 1, wherein the CS layer contains ion-exchanged silver, ion-exchanged potassium and ion-exchanged sodium.

3. The glass-based article of claim 1, wherein the glass-based article contains $Li_2O$.

4. The glass-based article of claim 1, wherein $Li_2O$ is present in the glass-based article in a range from 0.1 mol % to 20 mol %.

5. The glass-based article of claim 1, wherein $B_2O_3$ is present in the glass-based article in a range from 0.1 mol % to 10 mol %.

6. The glass-based article of claim 1, wherein $P_2O_5$ is present in the glass-based article in a range from 0.1 mol % to 10 mol %.

7. The glass-based article of claim 1, wherein the glass-based article is free of $K_2O$.

8. The glass-based article of claim 1, wherein the compressive stress (CS) at the first surface is in a range from 450 MPa to 1200 MPa.

9. The glass-based article of claim 1, wherein the surface compressive stress (CS) is in a range from 600 MPa to 1200 MPa.

10. The glass-based article of claim 1, wherein all points of the stress profile in the spike region comprise a tangent having a value that is in a range from −200 MPa/micrometer to −45 MPa/micrometer and all points in the tail region comprise a tangent having a value that is in a range from −2 MPa/micrometer to −0.01 MPa/micrometer.

11. The glass-based article of claim 1, wherein all points of the stress profile in the spike region comprise a tangent having a value that is in a range from −200 MPa/micrometer to −75 MPa/micrometer and all points in the tail region comprise a tangent having a value that is in a range from −1 MPa/micrometer to −0.01 MPa/micrometer.

12. The glass-based article of claim 1, wherein there is a compressive stress in the tail region of greater than 80 MPa at 0.1·t.

13. The glass-based article of claim 1, wherein all points of the stress profile in the tail region form a power-law profile having a power exponent, wherein the power exponent is in a range from about 1.2 to 3.4.

14. The glass-based article of claim 1, wherein t is in a range from about 0.1 millimeters to 3 millimeters.

15. The glass-based article of claim 1, wherein t is in a range from about 0.1 millimeters to 2 millimeters.

16. The glass-based article of claim 13, wherein the power exponent is in a range from about 1.3 to 2.8.

17. The glass-based article of claim 1, further exhibiting CIELAB color space coordinates, under a CIE illuminant F02, of L* values of about 90 and greater, a* values in a range from about −0.10 to about 0, and b* values in a range from about −0.10 to about 0.

18. The glass-based article of claim 1, further exhibiting an antimicrobial efficacy for *E. coli* of greater than 2 log kill.

19. The glass-based article of claim 1, further comprising a coating on the first surface.

20. The glass based article according to claim 19, wherein the coating comprises a scratch-resistant coating.

21. The glass-based article according to claim 19, wherein the coating comprises an easy-to-clean coating.

22. A device comprising:
a housing having front, back, and side surfaces;
electrical components that are at least partially inside the housing;
a display at or adjacent to the front surface of the housing; and
a cover substrate disposed over the display, wherein at least a portion of the housing or the cover substrate comprises the glass-based article of claim 1.

* * * * *

UNITED STATES PATENT AND TRADEMARK OFFICE
CERTIFICATE OF CORRECTION

PATENT NO. : 10,934,209 B2  
APPLICATION NO. : 15/727897  
DATED : March 2, 2021  
INVENTOR(S) : Vitor Marino Schneider Page 1 of 1

It is certified that error appears in the above-identified patent and that said Letters Patent is hereby corrected as shown below:

On the Title Page

In Column 2, item (57), Abstract, Line 1, after "Glass-based articles" delete "article".

On page 2, in Column 1, item (56), Other Publications, Line 3, delete "intsensitive" and insert -- insensitive --, therefor.

On page 2, in Column 1, item (56), Other Publications, Line 5, delete "intsensitive" and insert -- insensitive --, therefor.

In the Claims

In Column 32, Line 48, Claim 20, delete "glass based" and insert -- glass-based --, therefor.

Signed and Sealed this  
Twenty-seventh Day of July, 2021

Drew Hirshfeld  
*Performing the Functions and Duties of the*  
*Under Secretary of Commerce for Intellectual Property and*  
*Director of the United States Patent and Trademark Office*